(12) United States Patent
Faundez Hoffmann et al.

(10) Patent No.: US 11,832,084 B2
(45) Date of Patent: Nov. 28, 2023

(54) EQUALIZATION BASED ON DIFFUSE FIELD REPRESENTATION OF HEAD-RELATED TRANSFER FUNCTION AND TRANSDUCER-SPECIFIC DATA

(71) Applicant: META PLATFORMS TECHNOLOGIES, LLC, Menlo Park, CA (US)

(72) Inventors: Pablo Francisco Faundez Hoffmann, Kenmore, WA (US); Chuming Zhao, Bellevue, WA (US); David Brokenshire, Maidenhead (GB); Chuankeat Kho, San Jose, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 148 days.

(21) Appl. No.: 17/498,544

(22) Filed: Oct. 11, 2021

(65) Prior Publication Data

US 2022/0030377 A1 Jan. 27, 2022

Related U.S. Application Data

(60) Provisional application No. 63/140,698, filed on Jan. 22, 2021, provisional application No. 63/115,196, filed on Nov. 18, 2020.

(51) Int. Cl.
| | |
|---|---|
| *H04S 7/00* | (2006.01) |
| *G06F 3/01* | (2006.01) |
| *H04R 1/10* | (2006.01) |
| *H04R 5/02* | (2006.01) |

(52) U.S. Cl.
CPC ............ *H04S 7/304* (2013.01); *G06F 3/012* (2013.01); *H04S 7/307* (2013.01); *H04R 1/1008* (2013.01); *H04R 5/02* (2013.01); *H04S 7/306* (2013.01); *H04S 2400/11* (2013.01); *H04S 2420/01* (2013.01)

(58) Field of Classification Search
CPC .. H04S 2420/01; H04S 2400/13; H04S 7/306; H04S 7/307; H04S 7/30; H04R 2201/003; H04R 2201/02
See application file for complete search history.

(56) References Cited

U.S. PATENT DOCUMENTS

| | | | | |
|---|---|---|---|---|
| 10,743,128 | B1* | 8/2020 | Johansson | G06V 40/165 |
| 2016/0094919 | A1* | 3/2016 | Akino | H04R 19/04 |
| | | | | 381/174 |
| 2017/0240418 | A1* | 8/2017 | Qutub | H04R 1/04 |

* cited by examiner

*Primary Examiner* — Kile O Blair
(74) *Attorney, Agent, or Firm* — Fenwick & West LLP

(57) ABSTRACT

Embodiments relate to an audio system that performs equalization of audio signals based on one or more diffuse field head-related transfer functions (HRTFs) and device-specific data. User-specific data and device-specific data (i.e., transducer-specific data) are applied to an acoustic model to predict an acoustic response for a user. An equalization filter is then determined using the acoustic response and the one or more diffuse field HRTFs. The equalization filter is applied to a processed version of an audio signal to create a modified version of the audio signal. The modified version of the audio signal is presented to the user via a transducer array of the audio system. The audio system can further include a microphone assembly that reduces the Helmholtz resonance effect.

14 Claims, 15 Drawing Sheets

300

EQUALIZATION BASED ON DIFFUSE FIELD REPRESENTATION OF HEAD-RELATED TRANSFER FUNCTION AND TRANSDUCER-SPECIFIC DATA

CROSS REFERENCE TO RELATED APPLICATIONS

This application claims a priority and benefit to U.S. Provisional Patent Application Ser. No. 63/115,196, filed Nov. 18, 2020 and U.S. Provisional Patent Application Ser. No. 63/140,698, filed Jan. 22, 2021, each of which is hereby incorporated by reference in its entirety.

FIELD OF THE INVENTION

The present disclosure relates generally to spatialization of audio content, and specifically relates to equalization of audio content based on individual diffuse field representation of head-related transfer function (HRTF) and transducer-specific data.

BACKGROUND

A head-related transfer function (HRTF) encodes sound transmissions from a free field to ears of a listener (e.g., user of a headset with an embedded audio system). The HRTF depends on an audio frequency, a direction of sound propagation, a distance between a sound source and the listener, idiosyncrasies of the listener, etc. When the listener hears (e.g., through a transducer assembly such as headphones) sounds that have been filtered with one or more HRTFs corresponding to his or her own ears, the listener typically experiences sounds that appear to originate from well-defined directions in a surrounding physical space. Thus, any HRTF-based audio system that claims to ensure the highest-quality audio experience is required to accurately represent those listener-dependent characteristics. Besides individual HRTFs, it is also important to correct a response of a transducer assembly (e.g., headphones) for the individual characteristics of the listener's ears.

SUMMARY

Embodiments of the present disclosure support a method, an audio system, and a computer readable storage medium for equalization of audio content based on one or more individual diffuse field representations of HRTFs and transducer-specific data. User-specific data and device-specific data (i.e., transducer-specific data) are applied to an acoustic model to predict an acoustic response for a user (i.e., a listener of the audio system). An equalization filter is then determined using the acoustic response and the one or more individual diffuse field HRTFs. The equalization filter is applied to a processed version of an audio signal to create a modified version of the audio signal. The modified version of the audio signal is presented to the user via a transducer array of the audio system. The audio system can further include a microphone assembly that reduces the Helmholtz resonance effect.

Figure 1A:
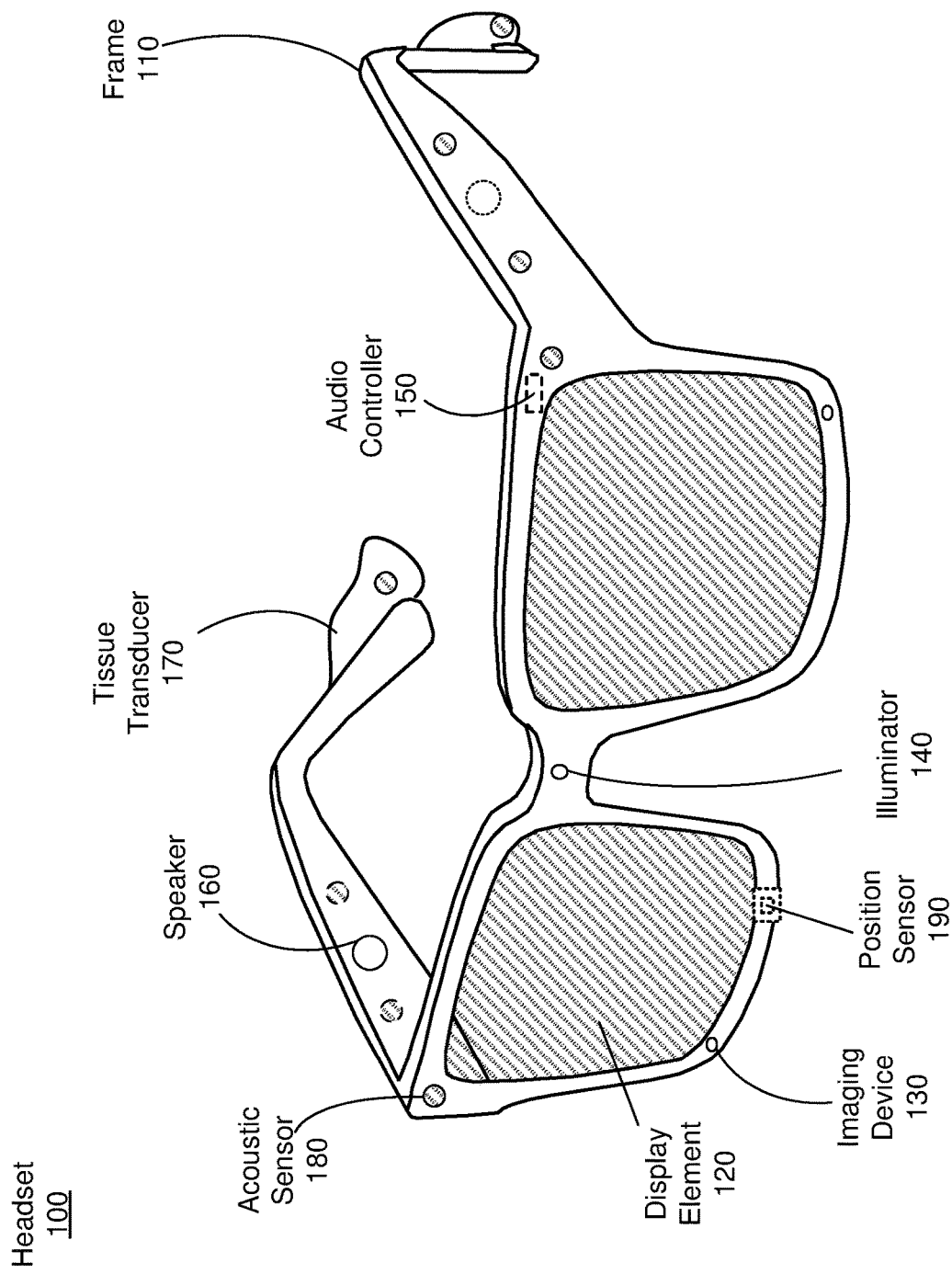
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the present disclosure relate to a method performed by components of an audio system for performing target headset equalization based on individual diffuse field representation of HRTF and device-specific (i.e., transducer-specific) data. In a complex frequency domain, a HRTF can be represented as a product of two transfer functions. The first transfer function may comprise one or more components that are common to all field sound directions (i.e., diffuse field components of the HRTF), and the second transfer function may comprise one or more components that are specific to each sound-source direction (i.e., directional components of the HRTF).

In accordance with embodiments of the present disclosure, the audio system splits each HRTF associated with a user (i.e., listener of the audio system) into one or more diffuse field HRTFs and a directional HRTF. The audio system may utilize the directional HRTF to generate a tonal balance filter. The audio system may further process the one or more diffuse field HRTFs using user-specific data and device-specific data (i.e., transducer-specific data) to determine a transducer equalization filter. Audio data processed by the tonal balance filter can be then input into the transducer equalization filter to generate an audio output for presentation to the user.

In accordance with some embodiments of the present disclosure, the audio system includes a microphone assembly configured to reduce effects from a resonance frequency (e.g., Helmholtz resonance) on a detected sound from a local area. The microphone assembly may include a micro-electronic mechanical machine (MEMS) microphone mounted on a printed circuit board (PCB), a tapered gasket (e.g., rubber gasket), and a cover layer (e.g., glass enclosure). The tapered gasket may be configured to seal the PCB against the cover layer. Tapering of the gasket may push the resonance frequency of the microphone assembly outside a range of human hearing (e.g., above 20 kHz) so that residual audio components at the resonance frequency are not audible anymore. The audio system presented herein with the microphone assembly that reduces the Helmholtz resonance effect may be integrated into, e.g., a headset, a watch, a mobile device, a tablet, etc.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated in FIG. 1A, the headset includes a display element 120 for each eye of a user. In some embodiments, a display element 120 generates image light that is provided to an eye box of the headset 100. The eye box is a location in space that an eye of the user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eye box of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eye box. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eye box. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the audio controller 150 may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. The tissue transducer 170 couples to the head of the user and directly vibrates tissue (e.g., bone or cartilage) of the user to generate sound. In accordance with embodiments of the present disclosure, the transducer array comprises two transducers (e.g., two speakers 160, two tissue transducers 170, or one speaker 160 and one tissue transducer 170), i.e., one transducer for each ear. The locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100. In accordance with some embodiments, the acoustic sensors 180 can be configured to reduce effects from a resonance frequency (i.e., Helmholtz resonance) such that the resonance frequency is not noticeable by the user. Details about the configuration of acoustic sensors for mitigation of the resonance frequency (i.e., mitigation of the Helmholtz resonance effect) are described in connection with FIGS. 6A-6D and FIGS. 7A-7B.

The audio controller 150 processes information from the sensor array that describes sounds detected by the sensor array. The audio controller 150 may comprise a processor and a non-transitory computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

In accordance with embodiments of the present disclosure, the audio controller 150 performs processing steps in relation to equalization of audio content for improved spatialization. The equalization is based on individual diffuse field representation of HRTFs and device-specific (e.g., transducer-specific) data. The equalized audio content may be presented to the user, e.g., via the speakers 160 and/or the tissue transducers 170. The audio controller 150 may first apply user-specific data and device-specific data to an acoustic model to predict an acoustic response for the user. The audio controller 150 may determine an equalization filter using the acoustic response and diffuse field HRTFs. The audio controller 150 may apply the equalization filter to audio content to create a modified version of the audio content. The speaker 160 and/or the tissue transducer 170 may present the modified version of the audio content to the user having improved spatialization relative to the original audio content. More details about this equalization process are described in connection with FIG. 3, FIG. 4 and FIG. 8.

In some embodiments, the audio system is fully integrated into the headset 100. In some other embodiments, the audio system is distributed among multiple devices, such as between a computing device (e.g., smart phone or a console) and the headset 100. The computing device may be interfaced (e.g., via a wired or wireless connection) with the headset 100. In such cases, some of the processing steps presented herein may be performed at a portion of the audio system integrated into the computing device. For example, one or more functions of the audio controller 150 may be implemented at the computing device. More details about the structure and operations of the audio system are described in connection with FIG. 2 and FIG. 9.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

The audio system can use positional information describing the headset 100 (e.g., from the position sensor 190) to update virtual positions of sound sources so that the sound sources are positionally locked relative to the headset 100.

In this case, when the user wearing the headset 100 turns their head, virtual positions of the virtual sources move with the head. Alternatively, virtual positions of the virtual sources are not locked relative to an orientation of the headset 100. In this case, when the user wearing the headset 100 turns their head, apparent virtual positions of the sound sources would not change.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 2 and FIG. 9.

Figure 1B:
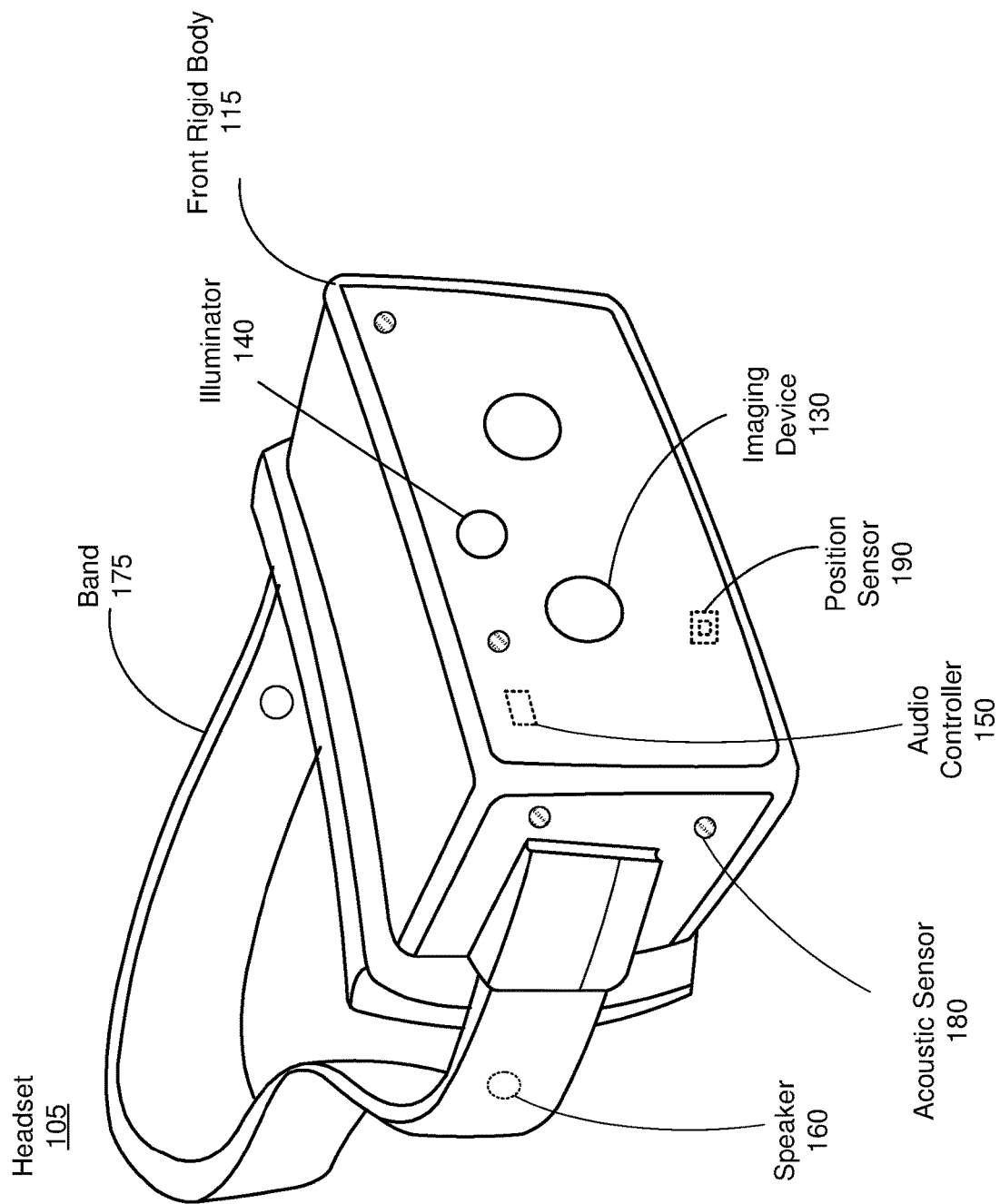
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to the front rigid body 115, or may be configured to be inserted within the ear canal of a user.

Figure 2:
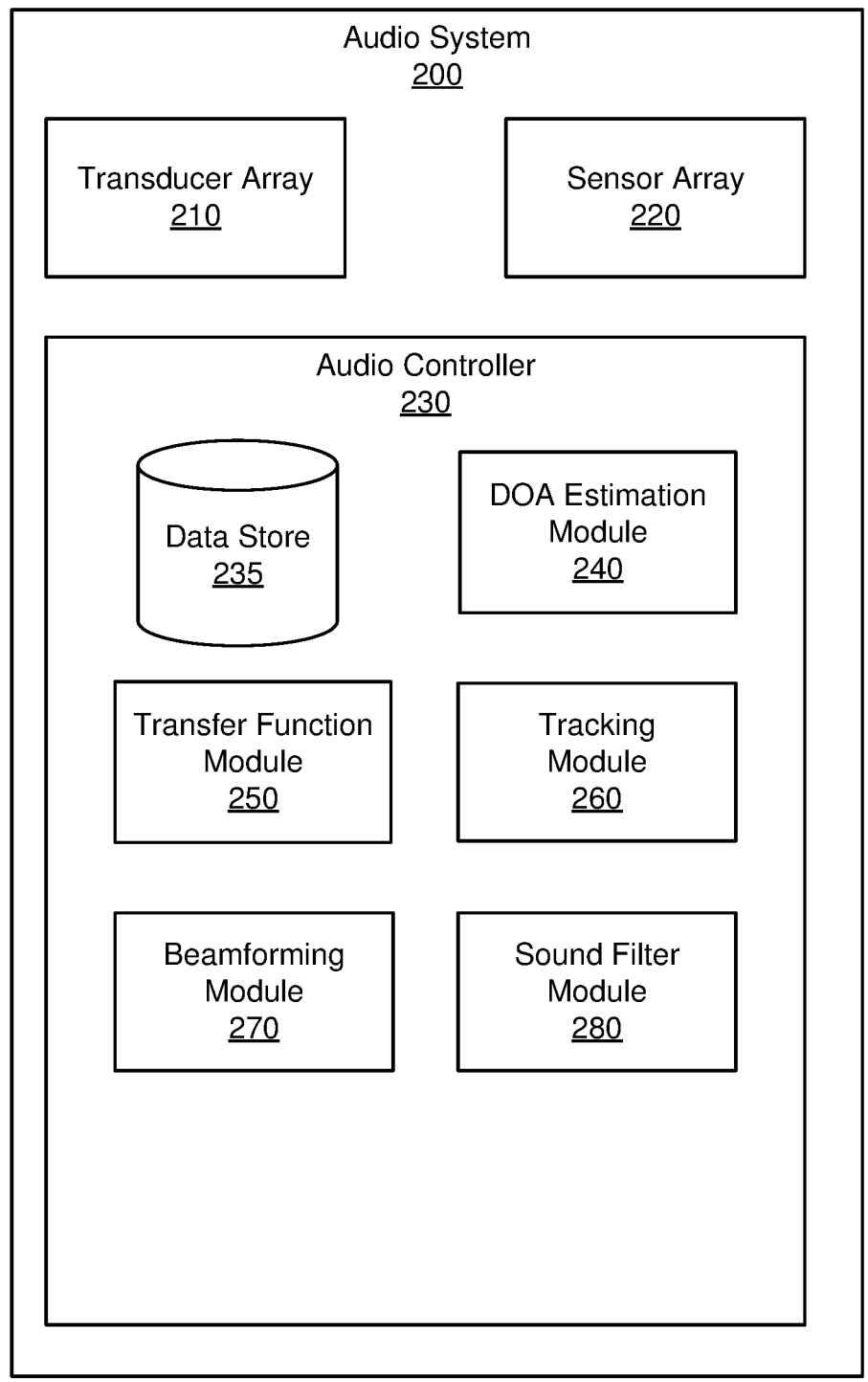
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a pair of transducers, i.e., one transducer for each ear. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or two speakers), via bone conduction (via one or two bone conduction transducer), via cartilage conduction audio system (via one or two cartilage conduction transducers), or some combination thereof.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a pair of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, and a sound filter module 280. The audio controller 230 may be located inside a headset, in some embodiments. Some embodiments of the audio controller 230 have different components than those described here. Similarly, functions can be distributed among the components in different manners than described here. For example, some functions of the audio controller 230 may be performed external to the headset. The user may opt in to allow the audio controller 230 to transmit data captured by the headset to systems external to the headset, and the user may select privacy settings controlling access to any such data.

In accordance with embodiments of the present disclosure, the audio controller 230 performs processing steps in relation to equalization of audio content for improved spatialization. The equalization is based on individual diffuse field representation of HRTFs and device-specific (e.g., transducer-specific) data. The equalized audio content may be presented to the user, e.g., the transducer array 210. The audio controller 230 may first apply user-specific data and device-specific data to an acoustic model to predict an acoustic response for the user. The audio controller 230 may determine an equalization filter using the acoustic response and diffuse field HRTFs. The audio controller 230 may apply the equalization filter to audio content to create a modified version of the audio content. The transducer array 210 may present the modified version of the audio content to the user of the audio system 200, wherein the modified version of the audio content features improved spatialization relative to the original audio content.

The data store 235 stores data for use by the audio system 200. Data in the data store 235 may include sounds recorded in the local area of the audio system 200, audio content, HRTFs, transfer functions for one or more sensors, array transfer functions (ATFs) for one or more of the acoustic sensors, sound source locations, virtual model of local area, direction of arrival estimates, sound filters, virtual positions of sound sources, multi-source audio signals, signals for transducers (e.g., speakers) for each ear, and other data relevant for use by the audio system 200, or any combination thereof. The data store 235 may be implemented as a non-transitory computer-readable storage medium.

The user may opt-in to allow the data store 235 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be ATFs, HRTFs, other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 9).

The sound filter module 280 provides the sound filters to the transducer array 210. In some embodiments, the sound filters may cause positive or negative amplification of sounds as a function of frequency. In some embodiments, audio content presented by the transducer array 210 is multi-channel spatialized audio. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200.

Equalization of Audio Signals

Figure 3:
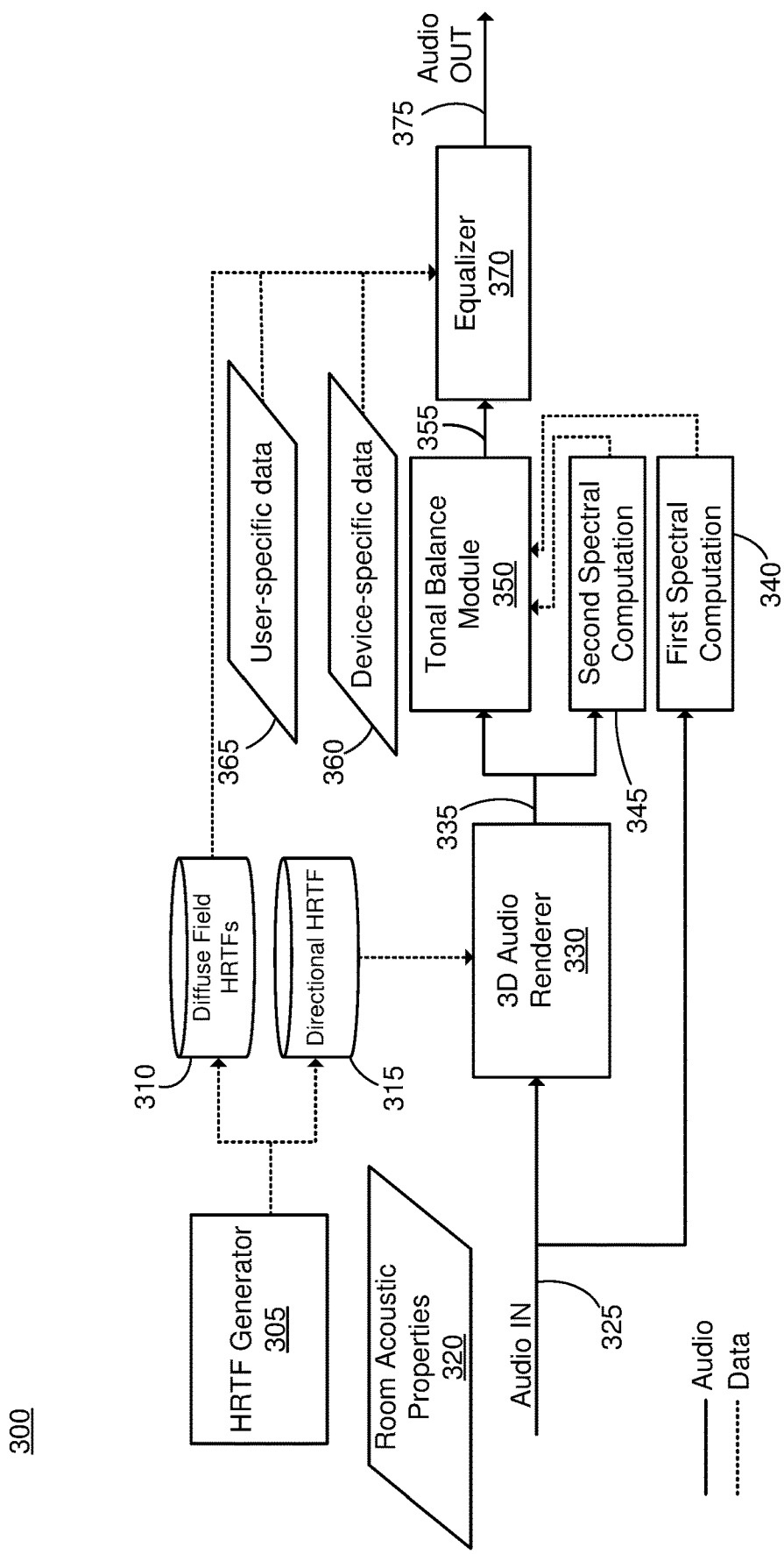
FIG. 3 illustrates a block diagram of a process for equalization of audio content implemented at the audio system, in accordance with one or more embodiments.

FIG. 3 illustrates a block diagram 300 of a process for equalization of audio content, which may be implemented at an audio system (e.g., the audio system 200), in accordance with one or more embodiments. Operations illustrated by the block diagram 300 may be performed by one or more components of the audio system, e.g., one or more components of the audio controller 230. The audio system first generates, at a HRTF generator module 305, one or more individual HRTFs for a given user. The HRTF generator module 305 may be part of the audio controller 230, e.g., part of the transfer function module 250, part of some other module of the audio controller 230, or a stand-alone module of the audio controller 230.

It should be noted that when considering a HRTF in the complex frequency domain, the HRTF can be treated as a transfer function that can be represented as a product of two different transfer functions. The first transfer function may comprise components that are common to all field directions, whereas the second transfer function may comprise components that are specific to each sound-source direction. This representation of the HRTF can be mathematically described as:

HRTF (f, listener, direction)=DFHRTF (f, listener)× DIRHRTF (f, listener, direction), (1) where HRTF(f, listener, direction) is a HRTF as a function of frequency, listener and sound direction, DFHRTF(f, listener) is a diffuse field representation of the HRTF (i.e., the first transfer function) that is a function of frequency and listener, and DIRHRTF(f, listener, direction) is a directional representation of the HRTF (i.e., the second transfer function) that is a function of frequency, listener and sound direction. The audio system may incorporate anthropometric data, computer vision, physical models, and machine learning methods to generate (e.g., via the transfer function module 250) one or more individual diffuse field representations of the HRTF, DFHRTFs 310, as well as an individual directional representation of the HRTF, DIRHRTF 315. The one or more diffuse field representations, DFHRTFs 310, and one more directional representations, DIRHRTFs 315, may be stored at, e.g., the data store 235 of the audio controller 230.

The diffuse field representation, DFHRTF 310, is a transfer function that is associated with simultaneous sound transmissions from all possible field directions to listener's ears. The diffuse field representation, DFHRTF 310, may be computed (e.g., via the transfer function module 250) as an average (either real and imaginary, magnitude, power, or decibels) across all available HRTFs for the given individual. On the other hand, the directional representation, DIRHRTF 315, is a directional transfer function as it represents a distilled version of directional information encoded in the HRTF. In accordance with Eq. (1), the directional representation, DIRHRTF 315, can be computed in the frequency domain as the ratio between the HRTF and the previously obtained diffuse field representation, DFHRTF 310.

Depending on an application, typical candidates for a transducer's acoustic response (e.g., headphone's acoustic response) are: free-field equalization, diffuse field equalization, flat equalization, and a response derived from an artificial head placed in an acoustically treated room at a "sweet spot" of a stereo configuration with sound reproduced over high-fidelity loudspeakers. It can be observed that the transducer's acoustic response can be described as a weighted diffuse field response where different sound directions are weighted differently depending on frequency-dependent absorption characteristics of a room and the time it takes for the reflected sound, that comes from different directions, to arrive at the listener's ears of the head located at the "sweet spot". If a transducer array (e.g., headphones) is intended for the reproduction of spatial sound as well as stereo music, the individual diffuse field representation, DFHRTF 310, is uniquely good candidate for the target transducer (e.g., headphone) acoustic response for that individual. This approach can be applied in cases where, e.g., the spatial sound is rendered using directional transfer functions, and/or where, e.g., a set of generic, personalized, or individual HRTFs have been diffuse field equalized.

The three-dimensional (3D) audio renderer module 330 may utilize individual spatial information encoded in the directional representation, DIRHRTF 315, together with room acoustic properties 320 to process an audio input signal 325 and generate a 3D rendered version 335 of the audio input signal 325. The 3D-audio renderer module 330 may be part of the audio controller 230, e.g., part of the sound filter module 280, part of some other module of the audio controller 230, or a stand-alone module of the audio controller 230. The room acoustic properties 320 may be pre-determined and available at, e.g., the data store 235, or may be computed in real time, e.g., by some module of the audio controller 230.

The audio input signal 325 (mono or multichannel audio signal) may be continuously analyzed at a first spectral computational block 340 to derive a first filter representing a spectral envelope of the mono signal or a spectral envelope of the down-mixed multichannel signal. The first spectral computational block 340 may be part of the audio controller 230, e.g., part of the sound filter module 280, part of some other module of the audio controller 230, or a stand-alone module of the audio controller 230. In one embodiment, the first spectral computational block 340 derives the first filter by performing linear predictive coding (LPC) to generate an IIR model of the spectral envelope. In another embodiment, the first spectral computational block 340 derives the first filter based on a sub-band representation of the audio input signal 325. The first filter generated at the first spectral computational block 340 can be referred to as "Hpre" in the frequency domain, i.e., the filter related to "pre-processed" version of the audio input signal 325.

Similarly, the 3D rendered version 335 (mono or multichannel rendered audio signal) may be continuously analyzed at a second spectral computational block 345 to derive a second filter representing a spectral envelope of the mono signal or a spectral envelope of the down-mixed multichannel signal. The second spectral computational block 345 may be part of the audio controller 230, e.g., part of the sound filter module 280, part of some other module of the audio controller 230, or a stand-alone module of the audio controller 230. Note that, for compatibility, the method applied by the first spectral computational block 340 for computation of the first filter should be the same method applied by the second spectral computational block 345 for computation of the second filter. The second filter generated at the second spectral computational block 345 can be referred to as "Hpost" in the frequency domain, i.e., the filter related to "post-processed" version of the audio input signal 325 which is the 3D rendered version 335.

The audio system may use the first filter, Hpre, and the second filter, Hpost, to generate, at a tonal balance module 350, a tonal balance filter. The tonal balance filter may be obtained as a ratio between the first filter, Hpre, and the second filter, Hpost, i.e., as the ratio Hpre/Hpost. The tonal balance module 350 that generates the tonal balance filter may also store filter coefficients of the tonal balance filter, i.e., the tonal balance module 350 may also perform the tonal balance filtering. The tonal balance module 350 may be part of the audio controller 230, e.g., part of the sound filter module 280, part of some other module of the audio controller 230, or a stand-alone module of the audio controller 230.

The audio system may filter, at the tonal balance module 350 by the tonal balance filter, the 3D rendered version 335 to generate a tonal balance filtered version 355 of the audio input signal 325. The tonal balance filter may filter all audio channels of the 3D rendered version 335 equally. The purpose of the tonal balance filtering is to preserve the overall tonal quality of the audio input signal 325 and thus avoid any undesired coloration that the 3D-audio rendering (performed at the audio renderer module 330) may introduce to the 3D rendered version 335 independently of whether or not the HRTF and the room-acoustic properties 320 has been pre-filtered for tonal neutrality. In one or more embodiments, the tonal balance filter may be time-varying and adapts to a spectral content of the audio input signal 325. Hence, the tonal balance module 350 may be implemented as a time-varying module that computes tonal-balance filters based on the spectral envelope of audio signals before and after 3D rendering in order to preserve the tonal quality of the original audio signal while still being able to properly spatialize the processed audio signal.

The audio system may use device-specific data (e.g., transducer-specific data) 360 together with user-specific data 365 to perform, at an equalizer 370, a transducer-based equalization of the tonal balance filtered version 355 to generate an equalized output audio signal 375. The equalizer 370 may be part of the audio controller 230, e.g., part of the sound filter module 280, part of some other module of the audio controller 230, or a stand-alone module of the audio controller 230. The device-specific data 360 and user-specific data 365 may be stored at, e.g., the data store 235.

Figure 4:
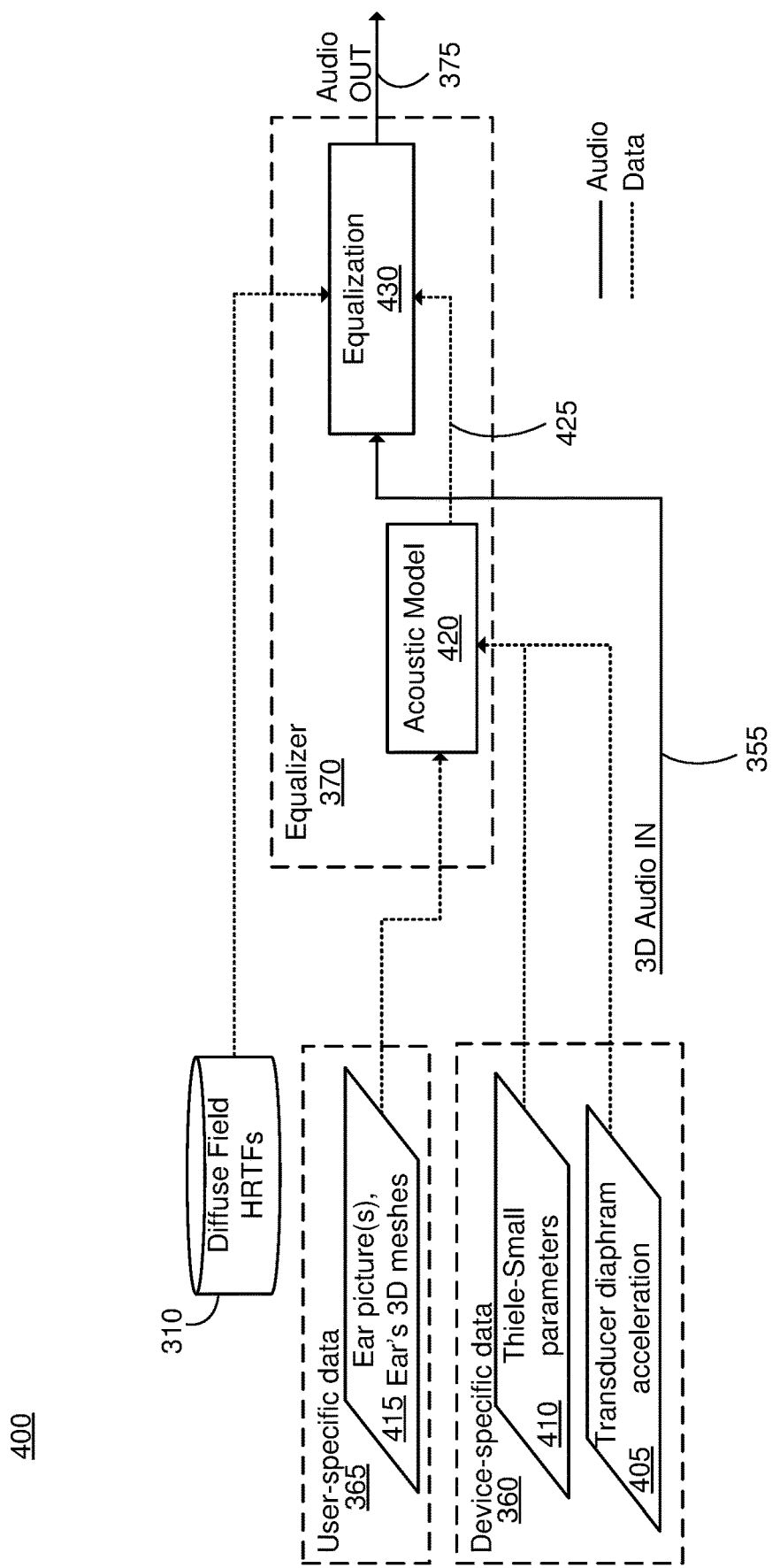
FIG. 4 illustrates a block diagram of an equalizer, which may be part of the equalization process in FIG. 3, in accordance with one or more embodiments.

FIG. 4 illustrates a detailed block diagram 400 of the equalizer 370, in accordance with one or more embodiments. The device-specific data 360 may comprise transducer-specific information related to, e.g., a transducer diaphragm acceleration 405 and Thiele-Small parameters 410. The Thiele-Small parameters 410 characterize electro-mechanical and acoustical properties of one or more transducers in the audio system (e.g., the speaker 160, the tissue transducer 170, and/or one or more transducers in the transducer array 210). The transducer diaphragm acceleration 405 and the Thiele-Small parameters 410 may be dependent to a voltage level input into a corresponding transducer. Hence, the transducer diaphragm acceleration 405 and/or the Thiele-Small parameters 410 may need to be measured and characterized, respectively, at different input voltage levels. The device-specific data 360 characterized at multiple input voltages can produce a better representation of the device performance (i.e., performance of a transducer array) for audio playback.

The user-specific data 365 may comprise user-specific information 415 related to, e.g., one or more pictures of the user's ear(s) and/or 3D meshes of the user's ear(s). The audio system may perform (e.g., via the audio controller 230) a process that transforms ear pictures to 3D geometries of the user's ear(s). The pictures of the user's ear(s) may be obtained from pictures taken by the user in situ or from pictures available at a server (e.g., cloud) interfaced (e.g., via a wireless connection) with the audio system 200.

The device-specific data 360 and the user-specific data 365 may be both input into an acoustic model 420 of a transducer array (e.g., a headphone device mounted on the user's ears). The combination of device-specific data 360 and the user-specific data 365 may be applied to the acoustic model 420 to generate (i.e., predict) an accurate frequency response 425 of the transducer-to-ear sound transmission, Pear. The frequency response 425 may be represented as an acoustic-pressure response as a function of a sound frequency. The acoustic model 420 may be pre-determined and stored at, e.g., an internal memory of the equalizer 370. Alternatively, the acoustic model 420 may be stored at the data store 235. The acoustic model 420 may be a finite element model (FEM) of the transducer array. The FEM may be simplified to a degree that ensures a reasonable amount of computational time while preserving accurate simulation results.

The audio system uses the predicted acoustic response 425, Pear, and the one or more diffuse field representations, DFHRTFs 310, at an equalization block 430 of the equalizer 370, to generate an equalization filter. In some embodiments, the equalization block 430 generates the equalization filter by, e.g., dividing the one or more diffuse field representations, DFHRTFs 310, by the predicted acoustic response 425, Pear. The equalization block 430 may also store filter coefficients for the equalization filter, i.e., the equalization block 430 may also perform the equalization filtering. In one or more embodiments, the equalization block 430 predicts the inverse of the predicted acoustic response 425, 1/Pear, directly in order to derive the equalization filter as a product of 1/Pear and the one or more diffuse field representations, DFHRTFs 310.

The audio system applies coefficients of the equalization filter, at the equalization block 430, to the tonal balance filtered version 355 to generate the equalized output audio signal 375. The equalized output audio signal 375 may be then provided to one or more transducers of the audio system (e.g., to the speaker 160, the tissue transducer 170, and/or the transducer array 210) for presentation to the user.

By performing the tonal filtering (i.e., at the tonal balance module 350) and equalization (i.e., at the equalizer 370) of the 3D rendered version 335 of the audio input signal 325, the audio system ends up with an overall processing result (i.e., the equalized output audio signal 375) that makes use of the full individual HRTF. Thus, upon presentation of the equalized output audio signal 375, listening experience of the user is substantially improved.

Figure 5A:
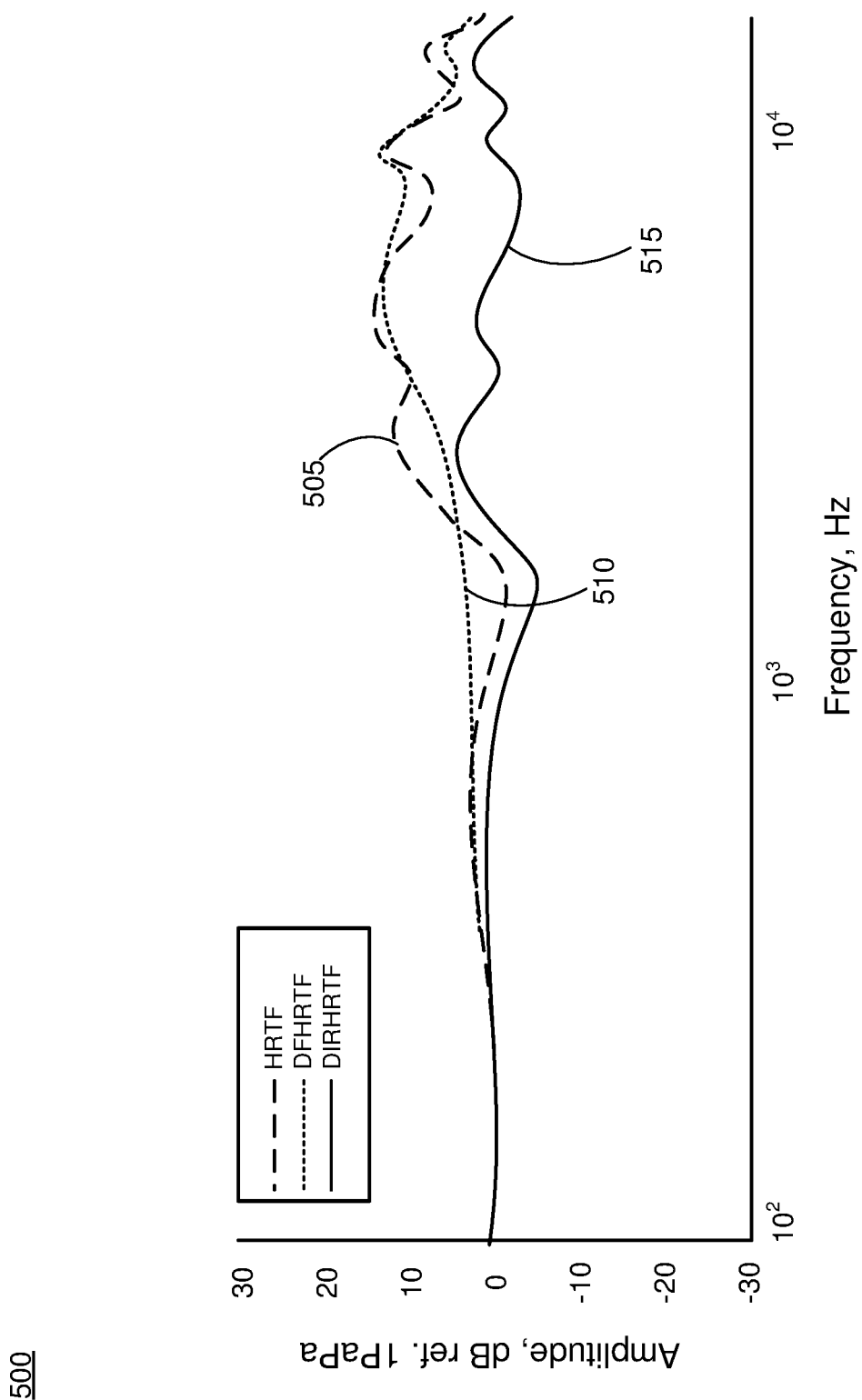
FIG. 5A illustrates an example graph of a HRTF, a diffuse field representation of the HRTF and a directional representation of the HRTF, in accordance with one or more embodiments.

FIG. 5A illustrates an example graph 500 of a HRTF, a diffuse field representation of the HRTF and a directional representation of the HRTF, in accordance with one or more embodiments. An amplitude of the full HRTF as a function of frequency is represented by a curve 505, an amplitude of the diffuse field representation of the HRTF as a function of frequency is represented by a curve 510, and an amplitude of the directional representation of the HRTF as a function of frequency is represented by a curve 515. The functions illustrated in the graph 500 are obtained from Finite-Difference Time-Domain (FDTD) simulation for the frontal direction (i.e., azimuth=0 and elevation=0) of a sound source. The diffuse field representation of the HRTF is computed from N=10,352 directions with the sound source at a distance of 1 meter.

Figure 5B:
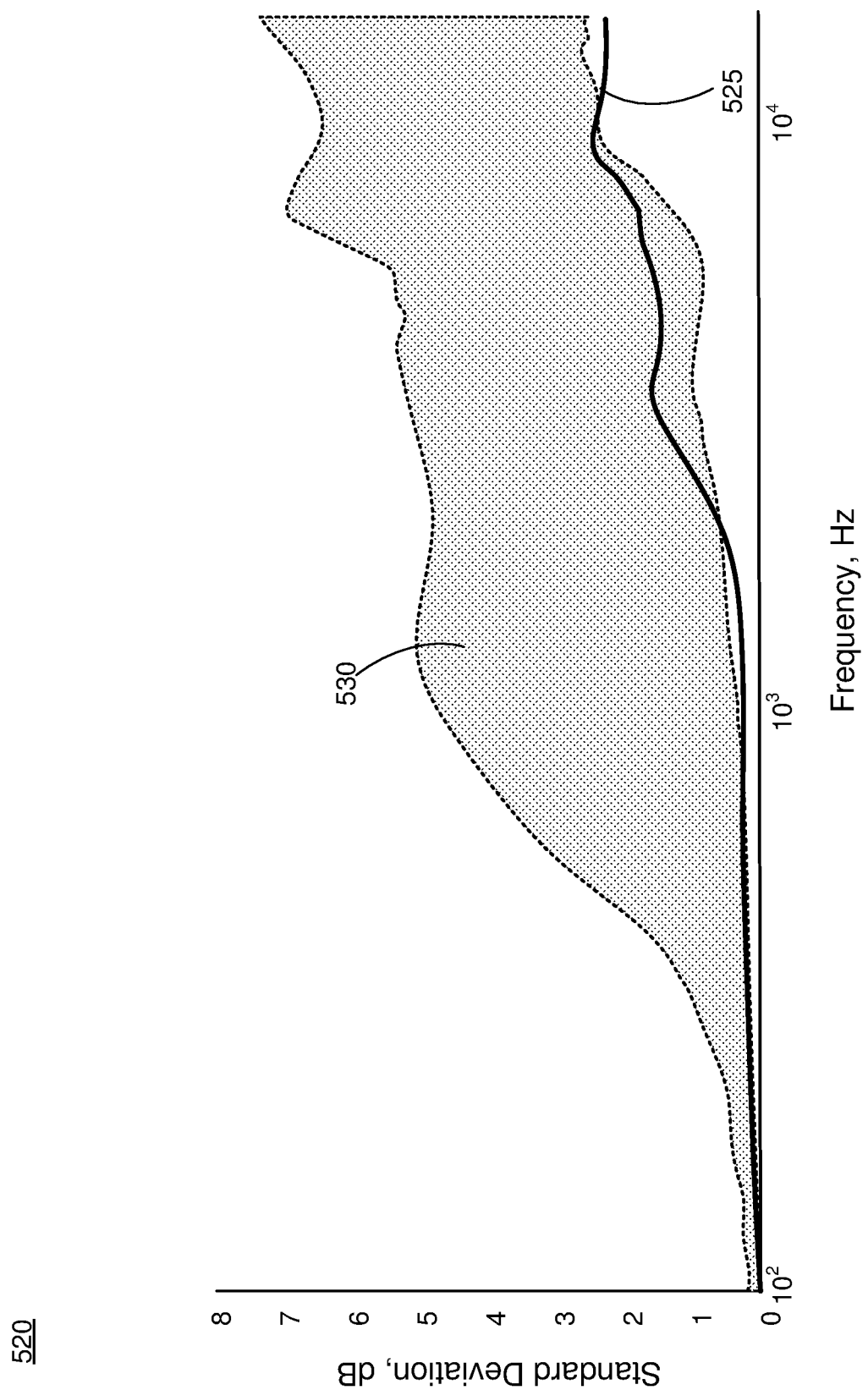
FIG. 5B illustrates an example graph of a standard deviation across multiple listeners for diffuse field representations of HRTFs and directional representations of HRTFs, in accordance with one or more embodiments.

FIG. 5B illustrates an example graph 520 of a standard deviation across multiple subjects (listeners) for diffuse field representations of HRTFs and directional representations of HRTFs, in accordance with one or more embodiments. The graph 520 shows a standard deviation 525 for the diffuse field representations of HRTFs, and a standard deviation 530 for the directional representations of HRTFs for N=693 subjects (listeners) with a sound source at a distance of 1 meter. It can be observed from FIG. 5B that diffuse field representations of HRTF vary considerably less across listeners relative to directional representations of HRTFs. Hence, the audio system presented herein has the flexibility of choosing a generic diffuse field representation of the HRTF, DFHRTF 310, while still preserving sufficient individual characteristics in the directional representation of the HRTF, DIRHRTF 315. Alternatively, the generic diffuse field representation of the HRTF may be a starting point that can be combined that with a parametric representation of the HRTF based on a combination of biquad filters of the HRTF to generate the one or more diffuse field representations of the HRTF, DFHRTFs 310.

Reduction of Microphone Helmholtz Resonance Effect

Figure 6A:
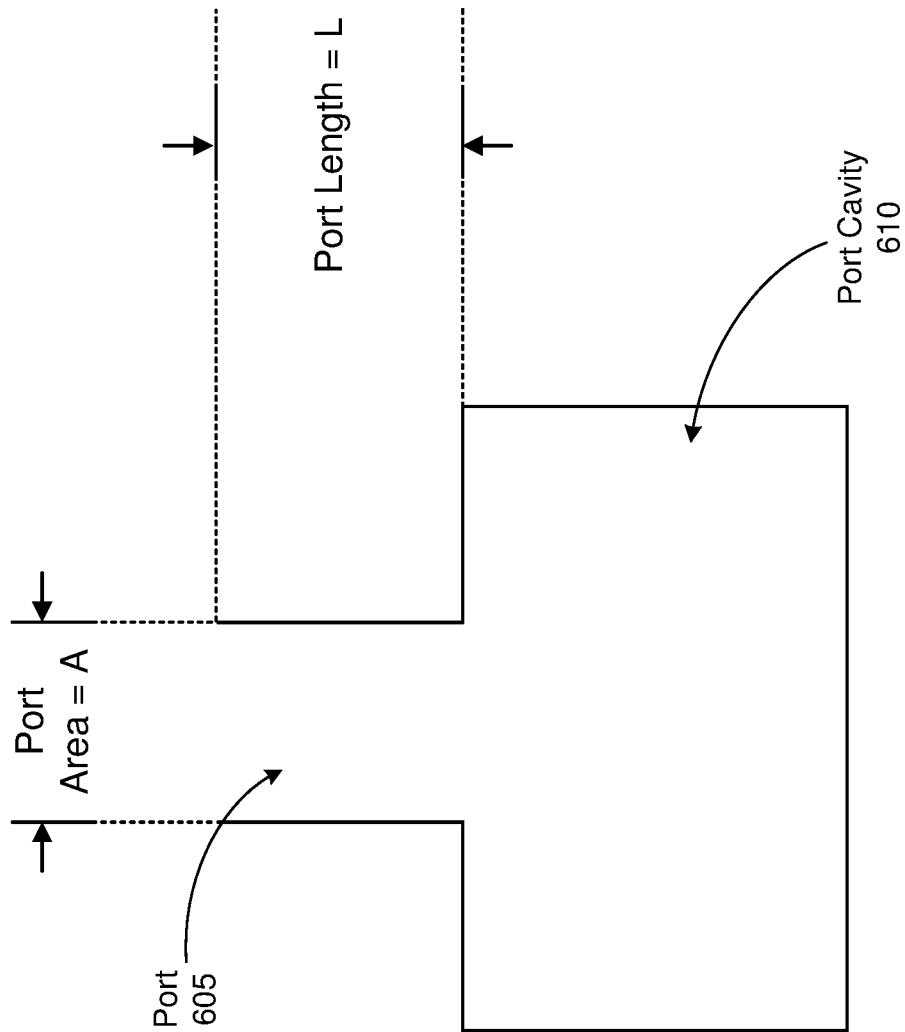
FIG. 6A illustrates an example microphone structure implemented as a Helmholtz resonator, in accordance with one or more embodiments.

In accordance with some embodiments of the present disclosure, the audio system 200 includes one or more microphone assemblies as part of the sensor array 220 configured to reduce negative effects from a resonance frequency (i.e., the Helmholtz resonance effect) on user's listening experience. FIG. 6A illustrates an example microphone structure 600 implemented as a Helmholtz resonator, in accordance with one or more embodiments. The microphone structure 600 (i.e., the Helmholtz resonator) includes a port 605 and a port cavity 610. The microphone structure 600 propagates sound waves through the port 605 and into the port cavity 610 where the sound waves are collected and amplified (upon reflection from internal walls of the port cavity 610) to be detected by a microphone (not shown in FIG. 6A) that may be coupled to an outer wall of the port cavity 610. The microphone structure 600 may generate output signals responsive to the sound waves detected by the microphone.

The sound waves that are collected and amplified within the port cavity 610 include one or more undesired (i.e., residual) components at a resonance frequency (i.e., Helmholtz resonance). Factors that determine a value of the resonance frequency are a volume (V) of the port cavity 610, a length (L) of the port 605, and an area (A) of the port 605. The resonance frequency (f) of the microphone structure 600 can be calculated as:

$$f = \frac{v}{2\pi}\sqrt{\frac{A}{V \cdot L}} \qquad (2)$$

where v is a velocity of the sound waves. The resonance frequency that is within a range of human hearing (e.g., below 20 kHz) has a negative effect on user's listening experience, which is a typical case for microphone assemblies with small form factors. Thus, it is desirable to design a microphone assembly with a small form factor that has a resonance frequency outside the range of human hearing (e.g., above 20 kHz).

Figure 6B:
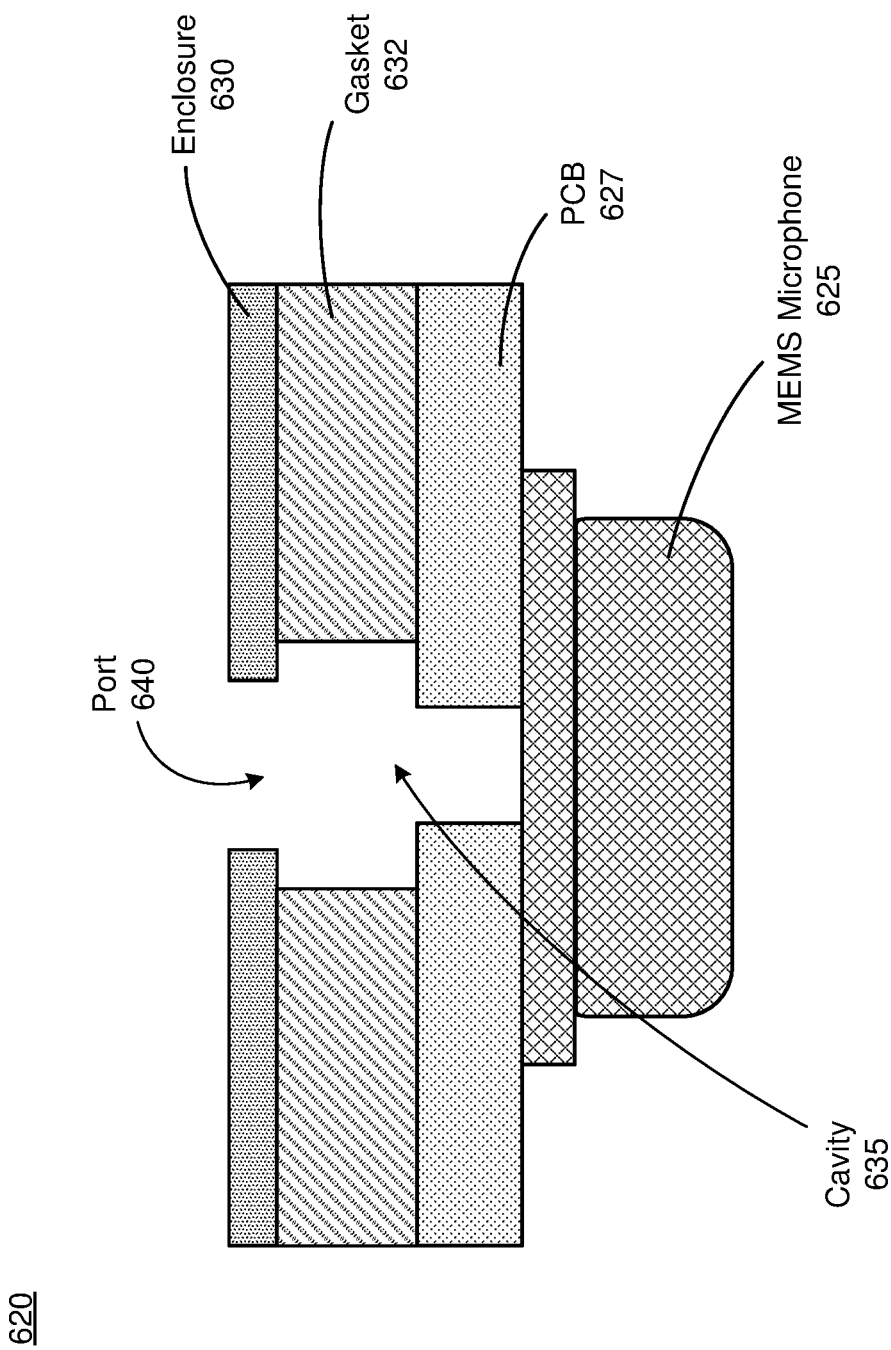
FIG. 6B illustrates an example printed circuit board (PCB) mounted micro-electronic mechanical machine (MEMS) microphone structure, which may be part of the audio system, in accordance with one or more embodiments.

FIG. 6B illustrates an example printed circuit board (PCB) mounted micro-electronic mechanical machine (MEMS) microphone structure 620, in accordance with one or more embodiments. The MEMS microphone structure 620 may be part of the audio system 200. The MEMS microphone structure 620 may be an embodiment of the acoustic sensor 180, and may be part of the sensor array 220. The MEMS microphone structure 620 includes a MEMS microphone 625 that is mounted on a PCB 627 and sealed against an enclosure 630 (e.g., glass) using a gasket 632 (e.g., a rubber gasket). A cavity 635 of the MEMS microphone structure 620 is formed by an internal structure of the MEMS microphone 635, an opening of the PCB 627 and an opening of the gasket 632. A port 640 of the MEMS microphone structure 620 is determined by a length and area of an opening in the enclosure 630.

The MEMS microphone structure 620 operates in the substantially same manner as the microphone structure 600 in FIG. 6A. The MEMS microphone structure 620 propagates sound waves through the port 640 and into the cavity 635 where the sound waves are collected and amplified (upon reflection from internal walls of the cavity 635) to be detected by the MEMS microphone 625 that is coupled (e.g., electrically coupled) to a bottom surface of the PCB 627. The PCB 627 may, e.g., provide power to the MEMS microphone 625 and/or receive output signals output from the MEMS microphone 625. The MEMS microphone 625 may generate the output signals responsive to the detected sound waves. The output signals may be provided to the PCB 627 and then to one or more other components of the audio system 200 (e.g., the audio controller 230) for further processing (e.g., as shown in FIGS. 3-4).

Figure 6C:
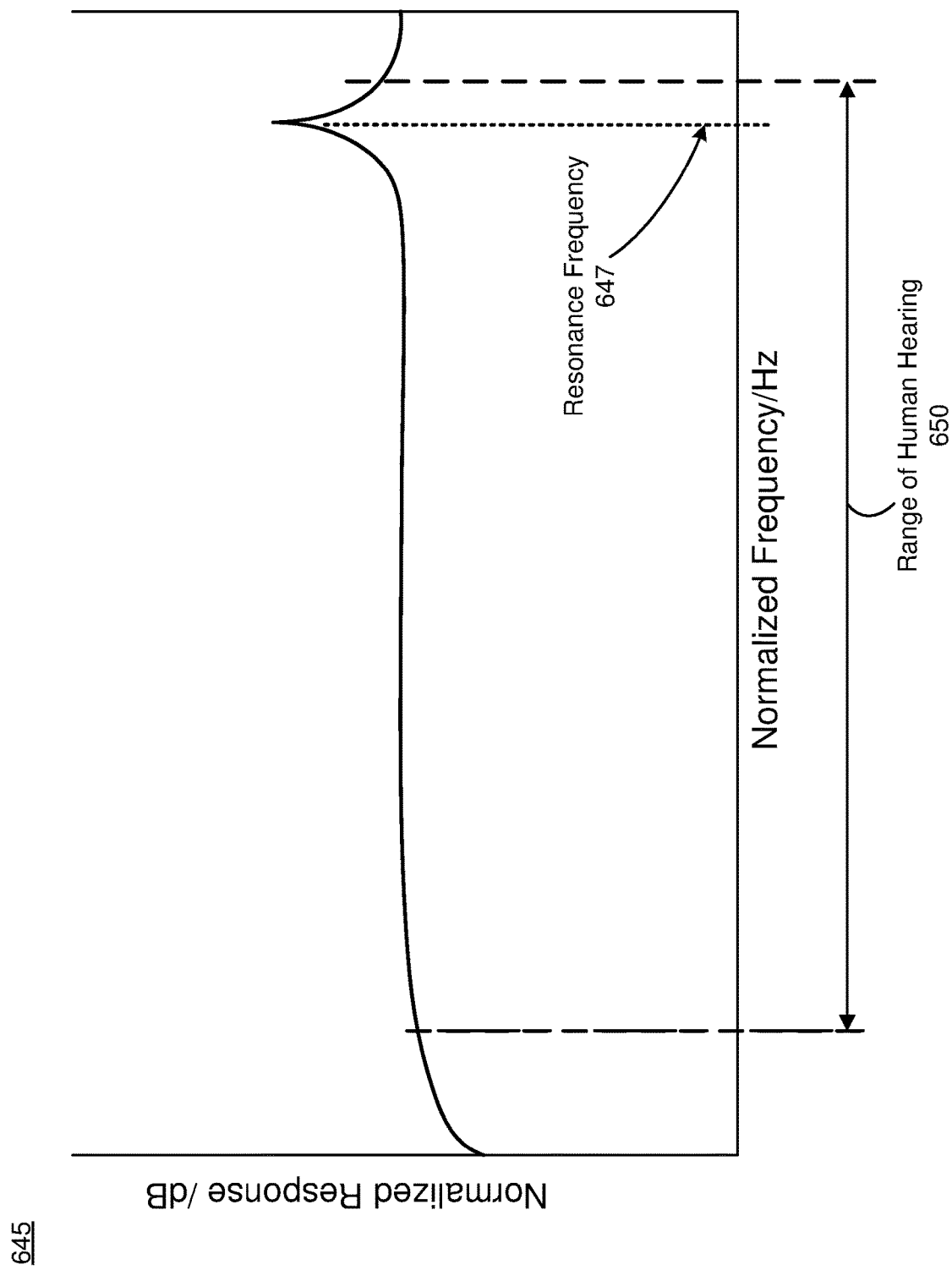
FIG. 6C is a graph of an example frequency response for the PCB mounted MEMS microphone structure in FIG. 6B, in accordance with one or more embodiments.

When considering a typical size opening required for the MEMS microphone 625, minimum material thicknesses, manufacturing and mounting tolerances associated with the PCB 627 and the gasket 632, a resonance frequency of the MEMS microphone structure 620 can be at a low enough frequency to be audible. FIG. 6C is a graph 645 of an example frequency response for the MEMS microphone structure 620, in accordance with one or more embodiments. It can be observed from the graph 645 that a resonance frequency 647 of the MEMS microphone structure 620 is still within a range of human hearing 650 (e.g., below 20 kHz). Thus, one or more undesired (i.e., residual) components of the frequency response for the MEMS microphone structure 620 at the resonance frequency 647 can be audible, which is undesirable from the point of user's listening experience.

Figure 6D:
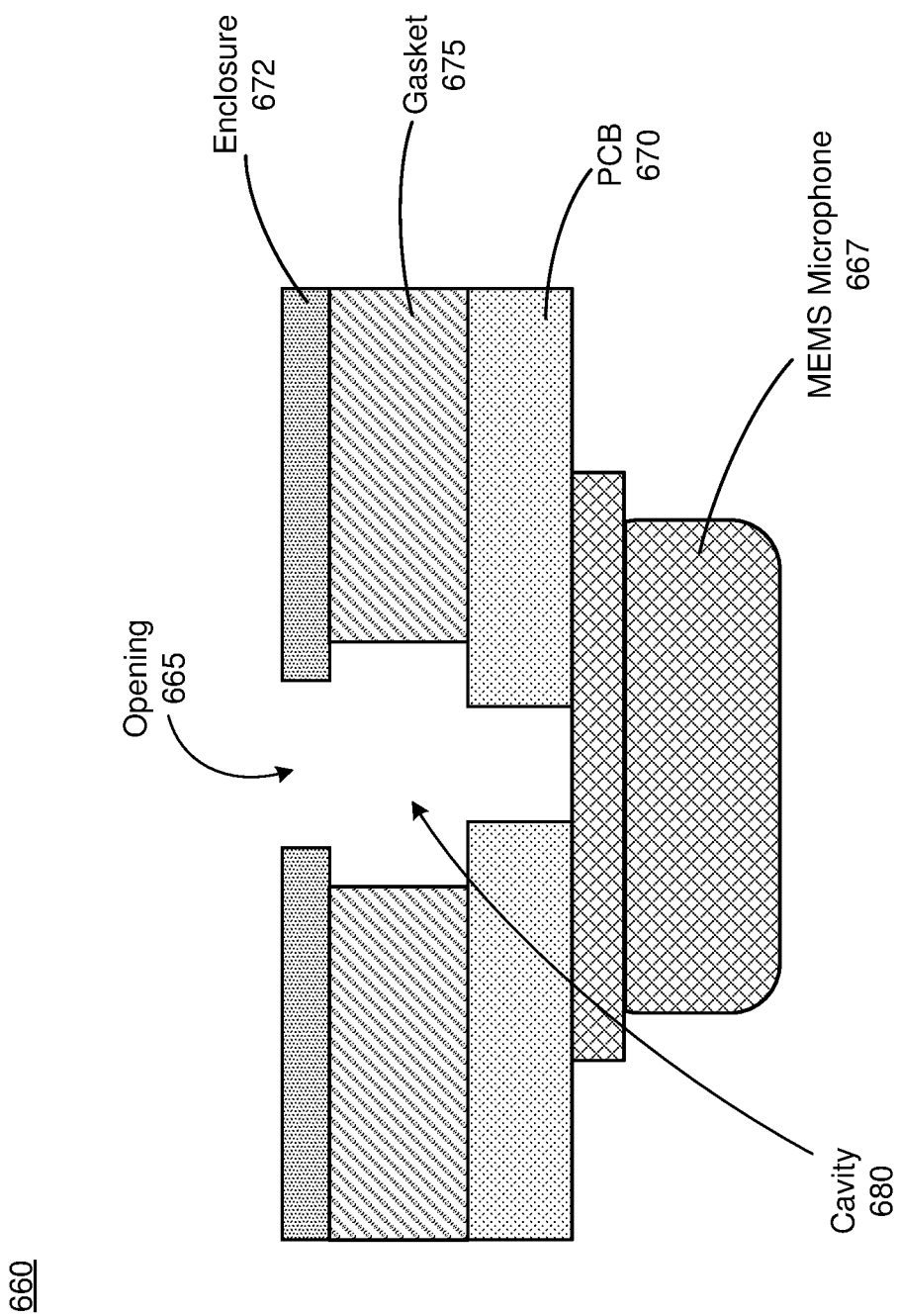
FIG. 6D illustrates an example PCB mounted MEMS microphone structure with a wide opening and without a port, which may be part of the audio system, in accordance with one or more embodiments.

FIG. 6D illustrates an example PCB mounted MEMS microphone structure 660 with a wide opening 665 and without a typical port, in accordance with one or more embodiments. The MEMS microphone structure 660 may be part of the audio system 200. The MEMS microphone structure 660 may be an embodiment of the acoustic sensor 180, and may be part of the sensor array 220. The MEMS microphone structure 660 includes a MEMS microphone 667 that is mounted on a PCB 670 and sealed against an enclosure 672 (e.g., glass) using a gasket 675 (e.g., rubber gasket). A cavity 680 of the MEMS microphone structure 660 is formed by an internal structure of the MEMS microphone 667, an opening (i.e., aperture) of the PCB 670 and an opening (i.e., aperture) of the gasket 675.

The MEMS microphone structure 660 operates in the substantially same manner as the MEMS microphone structure 620. The MEMS microphone structure 660 propagates sound waves through the opening 665 and into the cavity 680 where the sound waves are collected and amplified (upon reflection from internal walls of the cavity 680) to be detected by the MEMS microphone 667 that is coupled (e.g., electrically coupled) to a bottom surface of the PCB 670. The PCB 670 may electrically interface with the MEMS microphone 667. The PCB 670 may, e.g., provide power to the MEMS microphone 667 and/or receive output signals output from the MEMS microphone 667. The MEMS microphone 667 may generate the output signals responsive to the detected sound waves. The output signals may be provided to the PCB 670 and then to one or more other components of the audio system 200 (e.g., the audio controller 230) for further processing (e.g., as shown in FIGS. 3-4).

It can be observed from FIG. 6D that the opening 665 in the enclosure 672 is made wider than an opening in the gasket 675. In this way, a length of the opening 665 can be reduced while an area of the opening 665 can be increased. This may result, in accordance with Eq. (2), in a resonance frequency of the MEMS microphone structure 660 that is larger than the resonance frequency of the MEMS microphone structure 620, i.e., the resonance frequency of the MEMS microphone structure 660 can be outside the range of human hearing 650 (e.g., above 20 kHz). However, while the MEMS microphone structure 660 no longer forms a Helmholtz resonator, the design approach shown in FIG. 6D can result in a physically large opening in the enclosure 672, which is often externally visible. A large hole in a microphone assembly (such as the opening 665) can be undesirable with respect to design aesthetics.

Figure 7A:
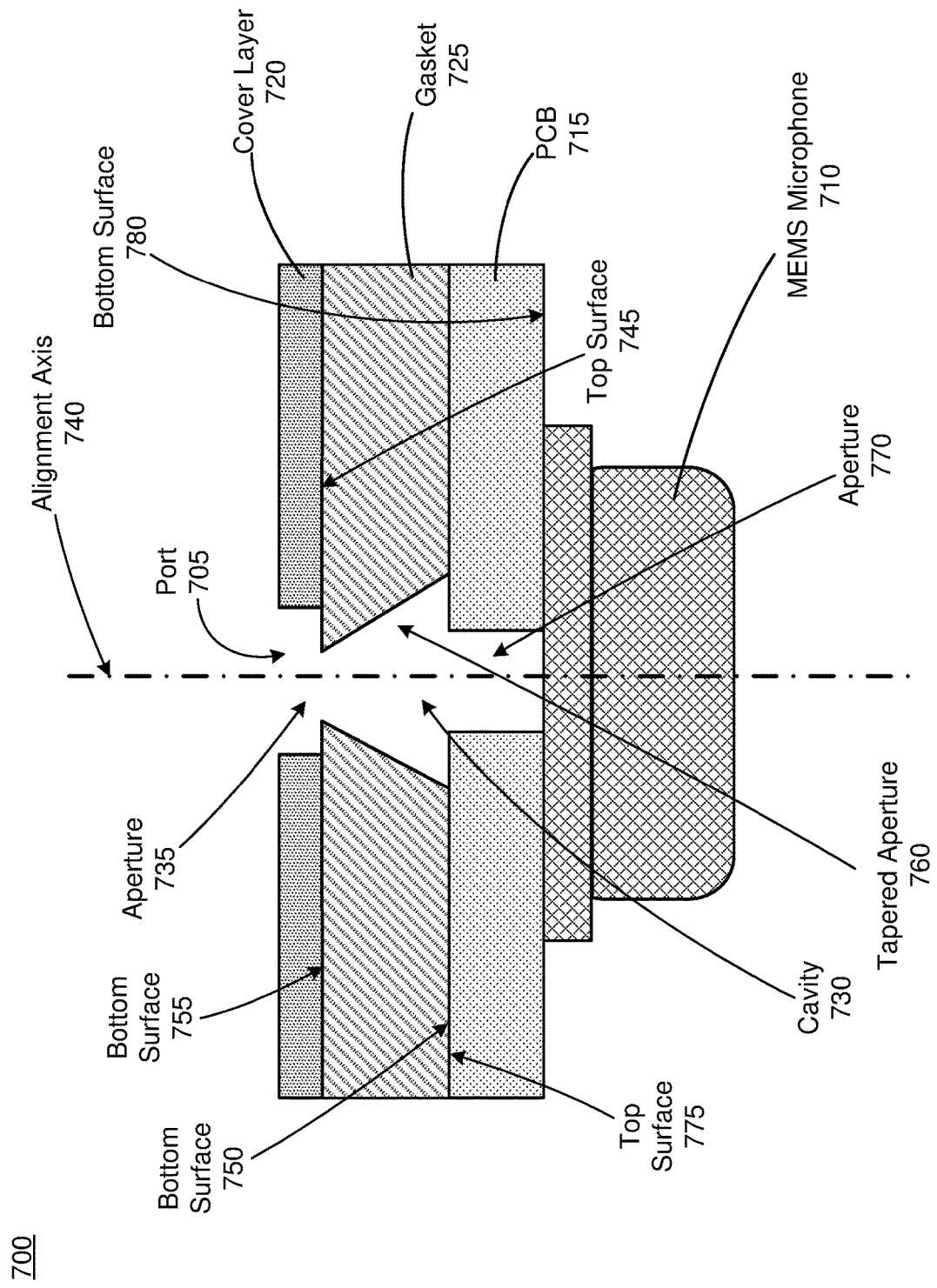
FIG. 7A is an example PCB mounted MEMS microphone structure with a tapered port, which may be part of the audio system, in accordance with one or more embodiments.

FIG. 7A illustrates an example PCB mounted MEMS microphone structure 700 with a tapered port 705, in accordance with one or more embodiments. The MEMS microphone structure 700 may be part of the audio system 200. The MEMS microphone structure 700 may be an embodiment of the acoustic sensor 180, and may be part of the sensor array 220. The MEMS microphone structure 700 includes a MEMS microphone 710 that is mounted on a PCB 715 and sealed against a cover layer 720 using a gasket 725. A cavity 730 of the MEMS microphone structure 700 is formed by an internal structure of the MEMS microphone 710, an opening (i.e., aperture) of the PCB 715 and an opening (i.e., aperture) of the gasket 725. The port 705 is tapered and is determined by corresponding openings in the cover layer 720, the gasket 725 and the PCB 715.

The cover layer 720 is an enclosure that protects a microphone assembly (i.e., the MEMS microphone structure 700) from surrounding environmental conditions. The cover layer 720 may be glass, plastic, metal, some other material, or some combination thereof. The cover layer 720 includes an aperture 735 centered on an alignment axis 740. The aperture 735 may have a circular cross section, a square cross section, or some other cross section.

The gasket 725 seals the PCB 715 against the cover layer 720. The gasket 725 includes a top surface 745 and a bottom surface 750. The gasket 725 may be made out of rubber, silicon, some other appropriate material, or some combination thereof. The top surface 745 of the gasket 725 is coupled to a bottom surface 755 of the cover layer 720. The gasket 725 includes a tapered aperture 760 that is centered on the alignment axis 740. The tapered aperture 760 has an aperture entrance that is proximate to an exit of the aperture 735 of the cover layer 720, and has an aperture exit that is proximate to an entrance of an aperture 770 of the PCB 715. In some embodiments, the tapered aperture 760 is tapered such that the aperture entrance of the tapered aperture 760 has a smaller area than the aperture exit of the tapered aperture 760. In alternate embodiments, the tapered aperture 760 is tapered such that the aperture exit of the tapered aperture 760 has a smaller area than the aperture entrance of the tapered aperture 760. The tapered gasket 725 thus seals the PCB 715 onto which the MEM microphone 710 is mounted against the cover layer 720 (e.g., glass enclosure).

The PCB 715 electrically interfaces with the MEMS microphone 710. The PCB 715 may, e.g., provide power to the MEMS microphone 710 and/or receive output signals output from the MEMS microphone 710. The PCB 715 includes a top surface 775 and a bottom surface 780. The top surface 775 is coupled to the bottom surface 750 of the gasket 725. The PCB 715 includes the aperture 770 that is centered on the alignment axis 740.

The MEMS microphone detects sound waves from a local area of the microphone assembly (i.e., the MEMS microphone structure 700) that propagate through the port 705 and into the cavity 730 toward the MEMS microphone 710. The MEMS microphone 710 is coupled (e.g., electrically coupled) to the bottom surface 780 of the PCB 715. The MEMS microphone 710 may generate output signals responsive to the detected sound waves. The output signals may be provided to the PCB 715 and then to one or more other components of the audio system 200 (e.g., the audio controller 230) for further processing (e.g., as shown in FIGS. 3-4).

The aperture 735 of the cover layer 720, the tapered aperture 760 of the gasket 725, and the aperture 770 of the PCB 715 together form the port 705 that has the Helmholtz resonance above the range of human hearing (e.g., above 20 kHz), which is not audible. The tapered aperture 760 of the gasket 725 reduces a volume of the cavity 730 within the port 705, thereby moving the Helmholtz resonance to a frequency that is outside the range of human hearing (e.g., above 20 kHz). Note that in other embodiments the amount of taper and/or size of the various apertures in the MEMS microphone structure 700 may be adjusted to move the resonance frequency to some other value (e.g., above 15 kHz, above 40 kHz, etc.).

Figure 7B:
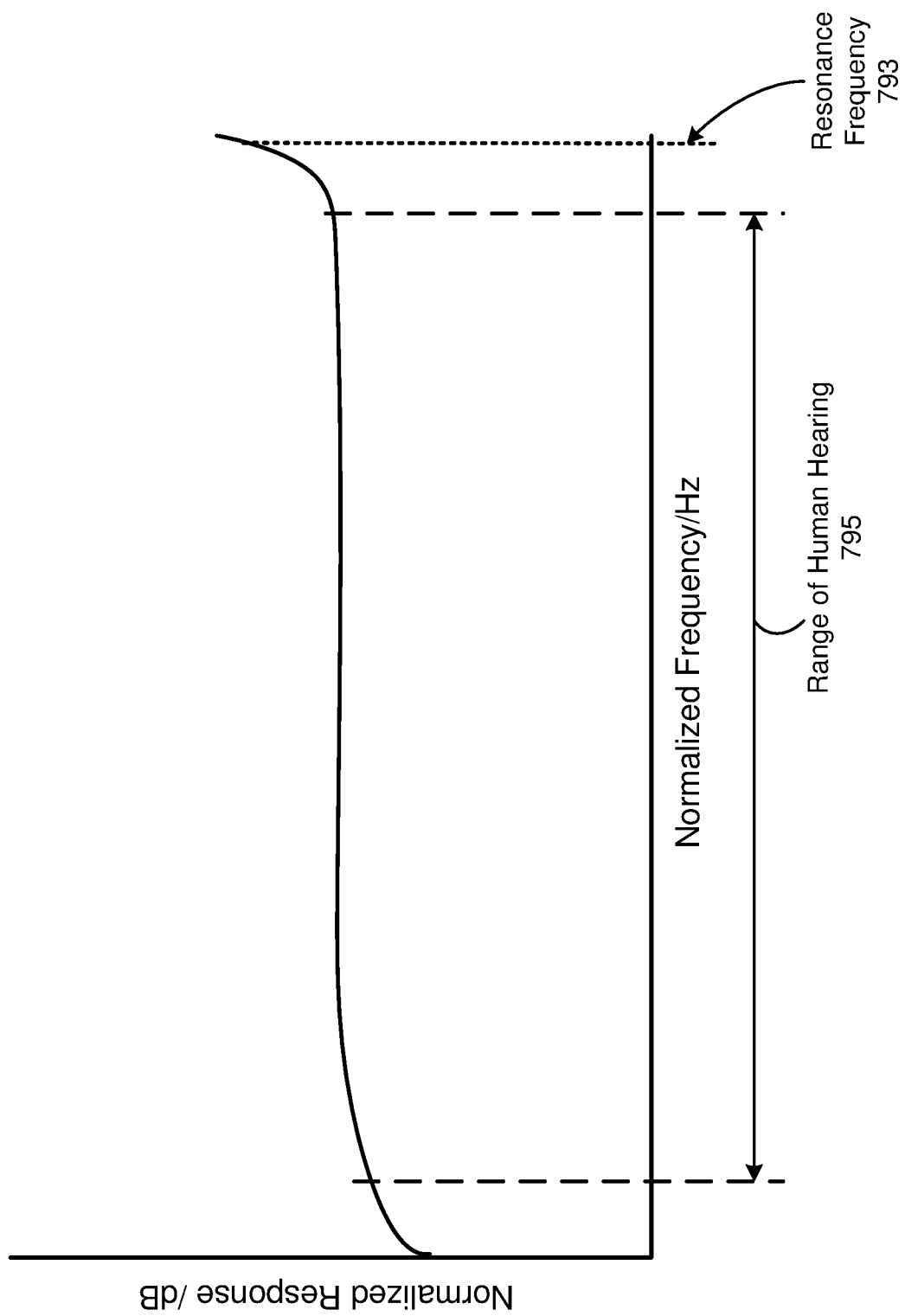
FIG. 7B is a graph of an example frequency response for the PCB mounted MEMS microphone structure in FIG. 7A, in accordance with one or more embodiments.

FIG. 7B is a graph 790 of an example frequency response for the MEMS microphone structure 700, in accordance with one or more embodiments. It can be observed from the graph 790 that a resonance frequency 793 is outside of a range of human hearing 790 (e.g., above 20 kHz). Thus, a component of the frequency response for the MEMS microphone structure 700 at the resonance frequency 793 is no longer noticeable (i.e., audible), which is desirable from the point of user's listening experience. Thus, the tapered gasket 725 of the MEMS microphone structure 700 allows the resonance frequency to be higher than the typical case for the microphone structure 600 in FIG. 6A.

Compared to the microphone structure 600 (i.e., typical design for a microphone assembly), the volume of the cavity 730 has been significantly reduced in comparison with the volume of the port cavity 610. A volume of an opening in the gasket 725 (i.e., a volume of the tapered aperture 760) has been reduced, and the port 705 is partially formed from the narrower section of the gasket 725. This is beneficial as the resonance frequency is, according to Eq. 2, inversely proportional to the volume of the cavity 730. Compared to the microphone structure 600, a length of the port 705 is reduced, since only a top end of the gasket 725 forms the port 705. This is beneficial as the resonance frequency is, according to Eq. 2, inversely proportional to the length of the port 705. Compared to the microphone structure 700, the external hole opening in the cover layer 720 (e.g., a glass enclosure opening) can be kept relatively small, without significantly lowering the resonance frequency. This is beneficial in terms of external appearance/design aesthetics. The two different hole sizes at either surface of the gasket 725 make it possible to still meet the mounting tolerances associated with factory assembly processes, while keeping the external hole small. Again, this is desirable regarding external appearance/design aesthetics.

Process Flow

Figure 8:
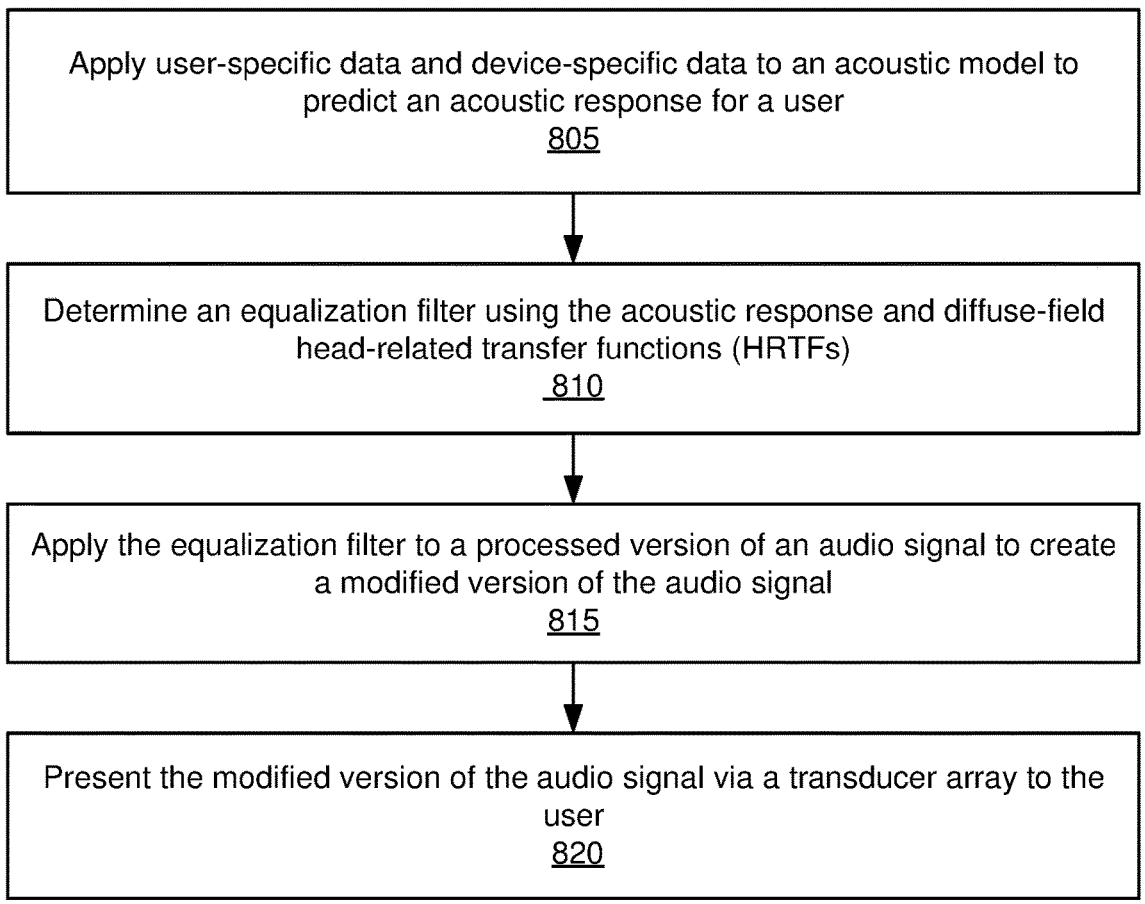
FIG. 8 is a flowchart illustrating a process for equalization of audio content based on diffuse field HRTFs and transducer-specific data, in accordance with one or more embodiments.

FIG. 8 is a flowchart illustrating a process 800 for equalization of audio content based on diffuse field HRTFs and transducer-specific data, in accordance with one or more embodiments. The process 800 shown in FIG. 8 may be performed by components of an audio system (e.g., components of the audio system 200 and/or components shown in FIGS. 3-4). Other entities may perform some or all of the steps in FIG. 8 in other embodiments. Embodiments may include different and/or additional steps, or perform the steps in different orders.

The audio system applies 805 (e.g., via the audio controller 230) user-specific data and device-specific data to an acoustic model to predict an acoustic response for a user. The user-specific data may comprise at least one of one or more images of an ear of the user and one or more three-dimensional meshes of the ear. The device-specific data may comprise at least one parameter characterizing at least one property of one or more transducers in the transducer array (e.g., the transducer array 210). The acoustic response may comprise a frequency response that describes a transducer-to-ear sound transmission for the transducer array and the user.

The audio system determines 810 (e.g., via the audio controller 230) an equalization filter using the acoustic response and one or more diffuse field HRTFs. The audio system may determine the equalization filter as a ratio of the one or more diffuse field HRTFs and the acoustic response. The audio system may derive the one or more diffuse field HRTFs from one or more HRTFs of the user. The one or more diffuse field HRTFs may comprise components that are common to all sound-source directions. Furthermore, the audio system may derive a directional HRTF from the one or more HRTFs of the user. The directional HRTF may comprise components that are specific to a specific sound-source direction.

The audio system applies 815 (e.g., via the equalizer 370) the equalization filter to a processed version of an audio signal to create a modified version of the audio signal. The audio system may render the audio signal using information about acoustic properties of a local area and the directional HRTF to generate a rendered version of the audio signal. The audio system may derive a tonal balance filter using the audio signal and the rendered version of the audio signal. The audio system may use the audio signal to derive a first filter that represents a spectral envelope of the audio signal, and the audio system may use the rendered version of the audio signal to derive a second filter that represents a spectral envelope of the rendered version of the audio signal. The audio system may derive the tonal balance filter using the first filter and the second filter. The audio system may apply the tonal balance filter to the rendered version of the audio signal to generate a balanced version of the audio signal. The audio system may apply the equalization filter to the balanced version of the audio signal to create the modified version of the audio signal.

The audio system presents 820 (e.g., via the transducer array 210) the modified version of the audio signal to the user.

The audio system may further detect sound from a local area using a microphone assembly (e.g., the MEMS microphone structure 700 as part of the sensor array 220) that is configured to have a resonance frequency (e.g., the Helmholtz resonance) above a range of human hearing (e.g., above 20 kHz). An output signal corresponding to a sound detected by the microphone assembly (e.g., the MEMS microphone structure 700) may be the audio input signal 325 input into the audio controller 230 that creates (e.g., after appropriate processing and equalization, as shown in FIGS. 3-4) audio content suitable for presentation to the user. The microphone assembly may comprise a cover layer including an aperture centered on an alignment axis. The microphone assembly may further comprise a gasket including a top surface and a bottom surface, the top surface of the gasket may be coupled to the cover layer, the gasket including a tapered aperture that is centered on the alignment axis. The microphone assembly may further comprise a PCB including a top surface and a bottom surface. The top surface of the PCB may be coupled to the bottom surface of the gasket, and the PCB may include an aperture that is centered on the alignment axis. The aperture of the cover layer, the tapered aperture of the gasket, and the aperture of the PCB may together form a port that has the resonance frequency above the range of human hearing. The microphone assembly may further comprise a MEMS microphone that is coupled to the bottom surface of the PCB, and may be configured to detect the sound from the local area that propagates through the port to the MEMS microphone.

System Environment

Figure 9:
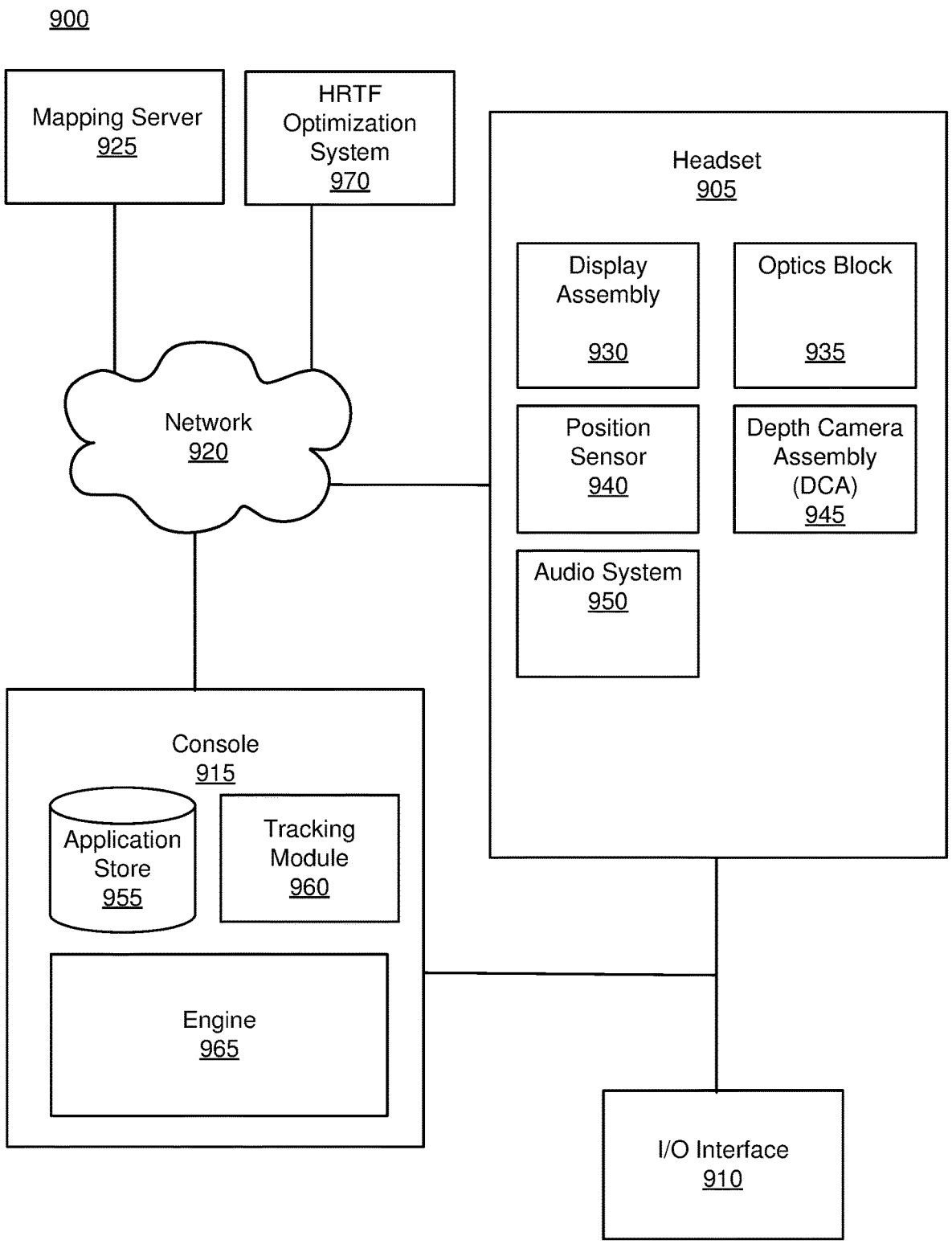
FIG. 9 depicts a block diagram of a system that includes a headset, in accordance with one or more embodiments.

FIG. 9 is a system 900 that includes a headset 905, in accordance with one or more embodiments. In some embodiments, the headset 905 may be the headset 100 of FIG. 1A or the headset 105 of FIG. 1B. The system 900 may operate in an artificial reality environment (e.g., a virtual reality environment, an augmented reality environment, a mixed reality environment, or some combination thereof). The system 900 shown by FIG. 9 includes the headset 905, an input/output (I/O) interface 910 that is coupled to a console 915, the network 920, and the mapping server 925. While FIG. 9 shows an example system 900 including one headset 905 and one I/O interface 910, in other embodiments any number of these components may be included in the system 900. For example, there may be multiple headsets each having an associated I/O interface 910, with each headset and I/O interface 910 communicating with the console 915. In alternative configurations, different and/or additional components may be included in the system 900. Additionally, functionality described in conjunction with one or more of the components shown in FIG. 9 may be distributed among the components in a different manner than described in conjunction with FIG. 9 in some embodiments. For example, some or all of the functionality of the console 915 may be provided by the headset 905.

The headset 905 includes the display assembly 930, an optics block 935, one or more position sensors 940, and the DCA 945. Some embodiments of headset 905 have different components than those described in conjunction with FIG. 9. Additionally, the functionality provided by various components described in conjunction with FIG. 9 may be differently distributed among the components of the headset 905 in other embodiments, or be captured in separate assemblies remote from the headset 905.

The display assembly 930 displays content to the user in accordance with data received from the console 915. The display assembly 930 displays the content using one or more display elements (e.g., the display elements 120). A display element may be, e.g., an electronic display. In various embodiments, the display assembly 930 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 935.

The optics block 935 may magnify image light received from the electronic display, corrects optical errors associated with the image light, and presents the corrected image light to one or both eye boxes of the headset 905. In various embodiments, the optics block 935 includes one or more optical elements. Example optical elements included in the optics block 935 include: an aperture, a Fresnel lens, a convex lens, a concave lens, a filter, a reflecting surface, or any other suitable optical element that affects image light. Moreover, the optics block 935 may include combinations of different optical elements. In some embodiments, one or more of the optical elements in the optics block 935 may have one or more coatings, such as partially reflective or anti-reflective coatings.

Magnification and focusing of the image light by the optics block 935 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 935 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 935 corrects the distortion when it receives image light from the electronic display generated based on the content.

The position sensor 940 is an electronic device that generates data indicating a position of the headset 905. The position sensor 940 generates one or more measurement signals in response to motion of the headset 905. The position sensor 190 is an embodiment of the position sensor 940. Examples of a position sensor 940 include: one or more IMUS, one or more accelerometers, one or more gyroscopes, one or more magnetometers, another suitable type of sensor that detects motion, or some combination thereof. The position sensor 940 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 905 from the sampled data.

For example, the IMU integrates the measurement signals received from the accelerometers over time to estimate a velocity vector and integrates the velocity vector over time to determine an estimated position of a reference point on the headset 905. The reference point is a point that may be used to describe the position of the headset 905. While the reference point may generally be defined as a point in space, however, in practice the reference point is defined as a point within the headset 905.

The DCA 945 generates depth information for a portion of the local area. The DCA includes one or more imaging devices and a DCA controller. The DCA 945 may also include an illuminator. Operation and structure of the DCA 945 is described above with regard to FIG. 1A.

The audio system 950 provides audio content to a user of the headset 905. The audio system 950 is substantially the same as the audio system 200 described above. The audio system 950 may comprise one or acoustic sensors, one or more transducers, and an audio controller. The audio system 950 may provide spatialized audio content to the user. In some embodiments, the audio system 950 may request acoustic parameters from the mapping server 925 over the network 920. The acoustic parameters describe one or more acoustic properties (e.g., room impulse response, a reverberation time, a reverberation level, etc.) of the local area. The audio system 950 may provide information describing at least a portion of the local area from e.g., the DCA 945 and/or location information for the headset 905 from the position sensor 940. The audio system 950 may generate one or more sound filters using one or more of the acoustic parameters received from the mapping server 925, and use the sound filters to provide audio content to the user.

In accordance with embodiments of the present disclosure, the audio system 950 performs processing steps in relation to equalization of audio content for improved spatialization of audio content. The equalization is based on one or more individual diffuse field representations of HRTFs and device-specific (e.g., transducer-specific) data. The audio system 950 may first apply user-specific data and device-specific data to an acoustic model to predict an acoustic response for the user. The audio system 950 may determine an equalization filter using the acoustic response and the one or more diffuse field HRTFs. The audio system 950 may apply the equalization filter to audio content to create a modified version of the audio content. The audio system 950 may present the modified version of the audio content to the user, wherein the modified version of the audio content features improved spatialization relative to the original audio content.

The I/O interface 910 is a device that allows a user to send action requests and receive responses from the console 915. An action request is a request to perform a particular action. For example, an action request may be an instruction to start or end capture of image or video data, or an instruction to perform a particular action within an application. The I/O interface 910 may include one or more input devices. Example input devices include: a keyboard, a mouse, a game controller, or any other suitable device for receiving action requests and communicating the action requests to the console 915. An action request received by the I/O interface 910 is communicated to the console 915, which performs an action corresponding to the action request. In some embodiments, the I/O interface 910 includes an IMU that captures calibration data indicating an estimated position of the I/O interface 910 relative to an initial position of the I/O interface 910. In some embodiments, the I/O interface 910 may provide haptic feedback to the user in accordance with instructions received from the console 915. For example, haptic feedback is provided when an action request is received, or the console 915 communicates instructions to the I/O interface 910 causing the I/O interface 910 to generate haptic feedback when the console 915 performs an action.

The console 915 provides content to the headset 905 for processing in accordance with information received from one or more of: the DCA 945, the headset 905, and the I/O interface 910. In the example shown in FIG. 9, the console 915 includes an application store 955, a tracking module 960, and an engine 965. Some embodiments of the console 915 have different modules or components than those described in conjunction with FIG. 9. Similarly, the functions further described below may be distributed among components of the console 915 in a different manner than described in conjunction with FIG. 9. In some embodiments, the functionality discussed herein with respect to the console 915 may be implemented in the headset 905, or a remote system.

The application store 955 stores one or more applications for execution by the console 915. An application is a group of instructions, that when executed by a processor, generates content for presentation to the user. Content generated by an application may be in response to inputs received from the user via movement of the headset 905 or the I/O interface 910. Examples of applications include: gaming applications, conferencing applications, video playback applications, or other suitable applications.

The tracking module 960 tracks movements of the headset 905 or of the I/O interface 910 using information from the DCA 945, the one or more position sensors 940, or some combination thereof. For example, the tracking module 960 determines a position of a reference point of the headset 905 in a mapping of a local area based on information from the headset 905. The tracking module 960 may also determine positions of an object or virtual object. Additionally, in some embodiments, the tracking module 960 may use portions of data indicating a position of the headset 905 from the position sensor 940 as well as representations of the local area from the DCA 945 to predict a future location of the headset 905. The tracking module 960 provides the estimated or predicted future position of the headset 905 or the I/O interface 910 to the engine 965.

The engine 965 executes applications and receives position information, acceleration information, velocity information, predicted future positions, or some combination thereof, of the headset 905 from the tracking module 960. Based on the received information, the engine 965 determines content to provide to the headset 905 for presentation to the user. For example, if the received information indicates that the user has looked to the left, the engine 965 generates content for the headset 905 that mirrors the user's movement in a virtual local area or in a local area augmenting the local area with additional content. Additionally, the engine 965 performs an action within an application executing on the console 915 in response to an action request received from the I/O interface 910 and provides feedback to the user that the action was performed. The provided feedback may be visual or audible feedback via the headset 905 or haptic feedback via the I/O interface 910.

The network 920 couples the headset 905 and/or the console 915 to the mapping server 925. The network 920 may include any combination of local area and/or wide area networks using both wireless and/or wired communication systems. For example, the network 920 may include the Internet, as well as mobile telephone networks. In one embodiment, the network 920 uses standard communications technologies and/or protocols. Hence, the network 920 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 920 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 920 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 925 may include a database that stores a virtual model describing a plurality of spaces, wherein one location in the virtual model corresponds to a current configuration of a local area of the headset 905. The mapping server 925 receives, from the headset 905 via the network 920, information describing at least a portion of the local area and/or location information for the local area. The user may adjust privacy settings to allow or prevent the headset 905 from transmitting information to the mapping server 925. The mapping server 925 determines, based on the received information and/or location information, a location in the virtual model that is associated with the local area of the headset 905. The mapping server 925 determines (e.g., retrieves) one or more acoustic parameters associated with the local area, based in part on the determined location in the virtual model and any acoustic parameters associated with the determined location. The mapping server 925 may transmit the location of the local area and any values of acoustic parameters associated with the local area to the headset 905.

The HRTF optimization system 970 for HRTF rendering may utilize neural networks to fit a large database of measured HRTFs obtained from a population of users with parametric filters. The filters are determined in such a way that the filter parameters vary smoothly across space and behave analogously across different users. The fitting method relies on a neural network encoder, a differentiable decoder that utilizes digital signal processing solutions, and performing an optimization of the weights of the neural network encoder using loss functions to generate one or more models of filter parameters that fit across the database of HRTFs. The HRTF optimization system 970 may provide the filter parameter models periodically, or upon request to the audio system 950 for use in generating spatialized audio content for presentation to a user of the headset 905. In some embodiments, the provided filter parameter models are stored in the data store of the audio system 950.

One or more components of system 900 may contain a privacy module that stores one or more privacy settings for user data elements. The user data elements describe the user or the headset 905. For example, the user data elements may describe a physical characteristic of the user, an action performed by the user, a location of the user of the headset 905, a location of the headset 905, HRTFs for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 900 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   applying user-specific data and device-specific data to an acoustic model to predict an acoustic response for a user;
   deriving one or more diffuse field head-related transfer functions (HRTFs) from one or more HRTFs of the user, the one or more diffuse field HRTFs comprise components that are common to all sound-source directions;
   deriving a directional HRTF from the one or more HRTFs of the user, the directional HRTF comprises components that are specific to a sound-source direction;
   determining an equalization filter using the acoustic response and the one or more diffuse field HRTF;
   rendering an audio signal using the directional HRTF and information about acoustic properties of a local area to generate a rendered version of the audio signal;
   deriving a tonal balance filter using the audio signal and the rendered version of the audio signal;
   applying the tonal balance filter to the rendered version of the audio signal to generate a balanced version of the audio signal;
   applying the equalization filter to the balanced version of the audio signal to create a modified version of the audio signal; and
   presenting the modified version of the audio signal via a transducer array to the user.

2. The method of claim 1, wherein the acoustic response comprises a frequency response that describes a transducer-to-ear sound transmission for the transducer array and the user.

3. The method of claim 1, wherein:
   the user-specific data comprise at least one of one or more images of an ear of the user and one or more three-dimensional meshes of the ear; and
   the device-specific data comprise at least one parameter characterizing at least one property of one or more transducers in the transducer array.

4. The method of claim 1, further comprising:
   determining the equalization filter as a ratio of the one or more diffuse field HRTFs and the acoustic response.

5. The method of claim 1, further comprising:
   deriving a first filter using the audio signal that represents a spectral envelope of the audio signal;
   deriving a second filter using the rendered version of the audio signal that represents a spectral envelope of the rendered version of the audio signal; and
   deriving the tonal balance filter using the first filter and the second filter.

6. The method of claim 1, further comprising:
   detecting sound from the local area using a microphone assembly configured to have a resonance frequency outside a range of human hearing; and
   creating the audio signal using the detected sound.

7. The method of claim 6, wherein the resonance frequency is a Helmholtz resonance frequency that is above 20 KHz.

8. An audio system, comprising:
   an audio controller configured to:
      apply user-specific data and device-specific data to an acoustic model to predict an acoustic response for a user,
      derive one or more diffuse field head-related transfer functions (HRTFs) from one or more HRTFs of the user, the one or more diffuse field HRTFs comprise components that are common to all sound-source directions,
      derive a directional HRTF from the one or more HRTFs of the user, the directional HRTF comprises components that are specific to a sound-source direction,
      determine an equalization filter using the acoustic response and the one or more diffuse field HRTF,
      render an audio signal using the directional HRTF and information about acoustic properties of a local area of the audio system to generate a rendered version of the audio signal,
      derive a tonal balance filter using the audio signal and the rendered version of the audio signal, and
      apply the tonal balance filter to the rendered version of the audio signal to generate a balanced version of the audio signal;
   an equalizer coupled to the audio controller, the equalizer configured to apply the equalization filter to the balanced version of the audio signal to create a modified version of the audio signal; and a transducer array coupled to the equalizer and the audio controller, the transducer array configured to present the modified version of the audio signal to the user.

9. The audio system of claim 8, wherein the acoustic response comprises a frequency response that describes a transducer-to-ear sound transmission for the transducer array and the user.

10. The audio system of claim 8, wherein:
the user-specific data comprise at least one of one or more images of an ear of the user and one or more three-dimensional meshes of the ear; and
the device-specific data comprise at least one parameter characterizing at least one property of one or more transducers in the transducer array.

11. The audio system of claim 8, further comprising a microphone assembly configured to have a resonance frequency outside a range of human hearing to detect sound from the local area and create the audio signal for the audio controller using the detected sound.

12. The audio system of claim 11, wherein the microphone assembly comprises:
a cover layer including an aperture centered on an alignment axis;
a gasket including a top surface and a bottom surface, the top surface of the gasket is coupled to the cover layer, the gasket including a tapered aperture that is centered on the alignment axis;
a printed circuit board (PCB) including a top surface and a bottom surface, the top surface of the PCB is coupled to the bottom surface of the gasket, and the PCB includes an aperture that is centered on the alignment axis, wherein the aperture of the cover layer, the tapered aperture of the gasket, and the aperture of the PCB together form a port that has the resonance frequency outside the range of human hearing; and
a micro-electronic mechanical machine (MEMS) microphone that is coupled to the bottom surface of the PCB, and is configured to detect the sound from the local area that propagates through the port to the MEMS microphone.

13. The audio system of claim 11, wherein the resonance frequency is a Helmholtz resonance frequency that is above 20 KHz.

14. A non-transitory computer-readable storage medium having instructions encoded thereon that, when executed by a processor, cause the processor to:
apply user-specific data and device-specific data to an acoustic model to predict an acoustic response for a user;
derive one or more diffuse field head-related transfer functions (HRTFs) from one or more HRTFs of the user, the one or more diffuse field HRTFs comprise components that are common to all sound-source directions;
derive a directional HRTF from the one or more HRTFs of the user, the directional HRTF comprises components that are specific to a sound-source direction;
determine an equalization filter using the acoustic response and the one or more diffuse field HRTFs;
render an audio signal using the directional HRTF and information about acoustic properties of a local area to generate a rendered version of the audio signal;
derive a tonal balance filter using the audio signal and the rendered version of the audio signal;
apply the tonal balance filter to the rendered version of the audio signal to generate a balanced version of the audio signal;
apply the equalization filter to the balanced version of the audio signal to create a modified version of the audio signal; and
control a transducer array to present the modified version of the audio signal to the user.

* * * * *